(12) United States Patent
Denney et al.

(10) Patent No.: US 9,332,294 B2
(45) Date of Patent: May 3, 2016

(54) TIMING OF DISPLAYED OBJECTS

(75) Inventors: Bradley Scott Denney, Irvine, CA (US);
Dariusz T. Dusberger, Irvine, CA (US);
Prateek Jain, Culver City, CA (US);
Ako Kobayashi, Laguna Niguel, CA (US); Manoj Mathew, Tustin, CA (US);
Don Hideyasu Matsubayashi, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 13/237,764

(22) Filed: Sep. 20, 2011

(65) Prior Publication Data

US 2013/0021369 A1 Jan. 24, 2013

Related U.S. Application Data

(60) Provisional application No. 61/510,875, filed on Jul. 22, 2011.

(51) Int. Cl.
*H04N 21/41* (2011.01)
*H04N 21/43* (2011.01)
*H04N 21/4363* (2011.01)

(52) U.S. Cl.
CPC ....... *H04N 21/4126* (2013.01); *H04N 21/4307* (2013.01); *H04N 21/43637* (2013.01)

(58) Field of Classification Search
CPC .......... H04N 5/23293; H04N 1/00127; H04N 1/00442; H04N 2201/0089; G09G 2380/16; G09G 2340/0492; G06F 17/30056
USPC ........................................................ 345/620
See application file for complete search history.

(56) References Cited

U.S. PATENT DOCUMENTS

| | | | |
|---|---|---|---|
| 6,081,262 A | 6/2000 | Gill et al. | |
| 6,757,479 B1* | 6/2004 | Niikawa | 386/224 |
| 7,587,671 B2 | 9/2009 | Saft et al. | |
| 2003/0085913 A1 | 5/2003 | Ahmad | |
| 2007/0046563 A1 | 3/2007 | Asai | |
| 2008/0248455 A1* | 10/2008 | Dohrmann | 434/365 |
| 2008/0282156 A1 | 11/2008 | Skicewicz | |
| 2009/0087016 A1* | 4/2009 | Berestov | G06K 9/00664 382/100 |
| 2009/0119596 A1 | 5/2009 | Iwahara et al. | |
| 2009/0153676 A1* | 6/2009 | Nakase | G06F 17/30274 348/207.99 |
| 2009/0160874 A1 | 6/2009 | Su | |
| 2009/0318194 A1 | 12/2009 | Alberth, Jr. et al. | |
| 2010/0074540 A1* | 3/2010 | Tang et al. | 382/225 |
| 2010/0153849 A1 | 6/2010 | West | |
| 2010/0194683 A1 | 8/2010 | Piper et al. | |
| 2010/0253864 A1 | 10/2010 | Fujinawa et al. | |
| 2011/0211764 A1* | 9/2011 | Krupka | G06F 17/30247 382/225 |
| 2012/0131465 A1* | 5/2012 | Telek et al. | 715/733 |

OTHER PUBLICATIONS

PowerPoint 2007 All-in-One Desk Reference for Dummies. Wiley Publishing, 2007. pp. 52, 496.*

* cited by examiner

*Primary Examiner* — James A Thompson
(74) *Attorney, Agent, or Firm* — Canon U.S.A., Inc. IP Division

(57) ABSTRACT

Systems and methods for displaying an object determine a display time of a first object, wherein the display time of the first object is determined based on one or more attributes of objects in a collection of objects, generate a display that includes at least part of the first object in a first portion of the display for the display time of the first object, wherein the display is configured for rendering on a display device, and remove the first object from the first portion of the display after the display time of the first object has elapsed.

31 Claims, 16 Drawing Sheets

TIMING OF DISPLAYED OBJECTS

CROSS-REFERENCE TO RELATED APPLICATIONS

This application claims priority to U.S. Provisional Patent Application Ser. No. 61/510,875, filed on Jul. 22, 2011, which is hereby incorporated by reference in its entirety.

BACKGROUND

1. Field

The present disclosure relates to timing of objects displayed in a slideshow.

2. Background

In the field of digital images, it is common to display a slideshow of objects. A "slideshow" refers to the selection of one or a few objects from a larger group of objects, for a timed and sometimes cyclical display. Often the objects are images, but the objects can also be other types of multimedia objects such as video sequences.

SUMMARY

Conventional slideshows often display a single image at a time. However, if the speed of the slideshow is too slow, a viewer may lose interest. Conversely, if the speed of the slideshow is too fast, the viewer may lose the ability to visually track the displayed images.

It has been considered to display more than a single image at a time, which increases the amount of information presented to the viewer. As a matter of principle, however, the issues of timing still persist, even though multiple images are displayed simultaneously, such that a viewer might lose interest if the slideshow is too slow, or might lose the ability to track displayed images if the slideshow is too fast.

In one example embodiment, a method comprises determining a display time of a first object, wherein the display time of the first object is determined based on one or more attributes of other objects in a collection of objects, generating a display that includes at least part of the first object in a first portion of the display for the display time of the first object, wherein the display is configured for rendering on a display device, and removing the first object from the first portion of the display after the display time of the first object has elapsed.

In one example embodiment, a method comprises determining a display time of a first object based on one or more attributes of a plurality of objects in a first group of objects, wherein the first group of objects includes the first object, and wherein the first group of objects is a subset of a collection of objects, generating a display that includes the first object at a first portion of the display for the display time of the first object, wherein the display is configured for rendering on a display device, and removing the first object from the first portion of the display after the display time of the first object has elapsed.

One example embodiment of a display method comprises retrieving a first selection of multiple objects from among a collection of plural objects stored in a data storage device, displaying the first selection of multiple objects on a display surface of a display device, wherein the first selection of multiple objects is displayed based on a first display attribute, obtaining a baseline shuffle interval, adjusting the baseline shuffle interval based at least in part on the first display attribute, retrieving a second selection of multiple objects from amongst the collection of plural objects stored in the data storage device, and displaying the second selection of multiple objects on the display surface of the display device when the first selection of multiple objects has been displayed for at least as long as the adjusted baseline shuffle interval.

According to one example embodiment, multiple objects are displayed according to a baseline shuffle interval. The baseline shuffle interval is adjusted based on one or more display attributes. The display attributes may include, for example, the number of concurrently displayed objects, the multimedia types of the displayed objects, the dimensions of the displayed objects relative to full dimensions of the display surface, and the dimensions of the displayed objects relative to full dimensions of the objects as stored in a memory of the display device.

In an example embodiment described herein, a first selection of multiple objects is retrieved from amongst a collection of plural objects stored in a data storage device. The first selection of multiple objects is displayed on a display surface of a display device based on a first display attribute. A baseline shuffle interval is obtained. The baseline shuffle interval is adjusted based at least in part on the first display attribute. A second selection of multiple objects is retrieved from amongst the collection of plural objects stored in the data storage device, and the second selection of multiple objects is displayed on the display surface of the display device when the first selection of multiple objects has been displayed for at least as long as the adjusted baseline shuffle interval.

In one example embodiment, a display apparatus comprises a computer-readable memory constructed to store computer-executable process steps, and a processor constructed to execute the computer-executable process steps stored in the memory, wherein the process steps stored in the memory cause the processor to retrieve a first selection of multiple objects from amongst a collection of plural objects stored in a data storage device, display the first selection of multiple objects on a display surface of a display device, wherein the first selection of multiple objects is displayed based on a first display attribute, obtain a baseline shuffle interval, adjust the baseline shuffle interval based at least in part on the first display attribute, retrieve a second selection of multiple objects from amongst the collection of plural objects stored in the data storage device, and display the second selection of multiple objects on the display surface of the display device when the first selection of multiple objects has been displayed for at least as long as the adjusted baseline shuffle interval.

In an example embodiment, a non-transitory computer-readable storage medium retrievably stores computer-executable process steps for performing a display method, the method comprising retrieving a first selection of multiple objects from amongst a collection of plural objects stored in a data storage device, displaying the first selection of multiple objects on a display surface of a display device, wherein the first selection of multiple objects is displayed based on a first display attribute, obtaining a baseline shuffle interval, adjusting the baseline shuffle interval based at least in part on the first display attribute, retrieving a second selection of multiple objects from amongst the collection of plural objects stored in the data storage device, and displaying the second selection of multiple objects on the display surface of the display device when the first selection of multiple objects has been displayed for at least as long as the adjusted baseline shuffle interval.

In an example embodiment, a system comprises one or more computer-readable media, a display interface configured to transmit data to a display device, and one or more processors configured to cause the system to determine a first display time for a first object based on one or more attributes of the first object or of another object in a collection of objects, determine a second display time for a second object based on one or more attributes of the second object or of another object in the collection of objects, generate a display that includes at least part of the first object for a duration of the first display time, wherein the display is configured to be rendered on a display device, and add at least part of the second object to the display for a duration of the second display time after the first display time has elapsed.

By displaying multiple objects according to a baseline shuffle interval which is adjusted based on display attributes, it is ordinarily possible to provide a user with the ability to view a slideshow that simultaneously displays multiple objects, while tailoring the shuffling of the multiple objects to a speed appropriate for the conditions of the objects being displayed and/or the display.

This brief summary has been provided so that the nature of this disclosure may be understood quickly. A more complete understanding can be obtained by reference to the following detailed description and to the attached drawings.

DETAILED DESCRIPTION

Figure 1:
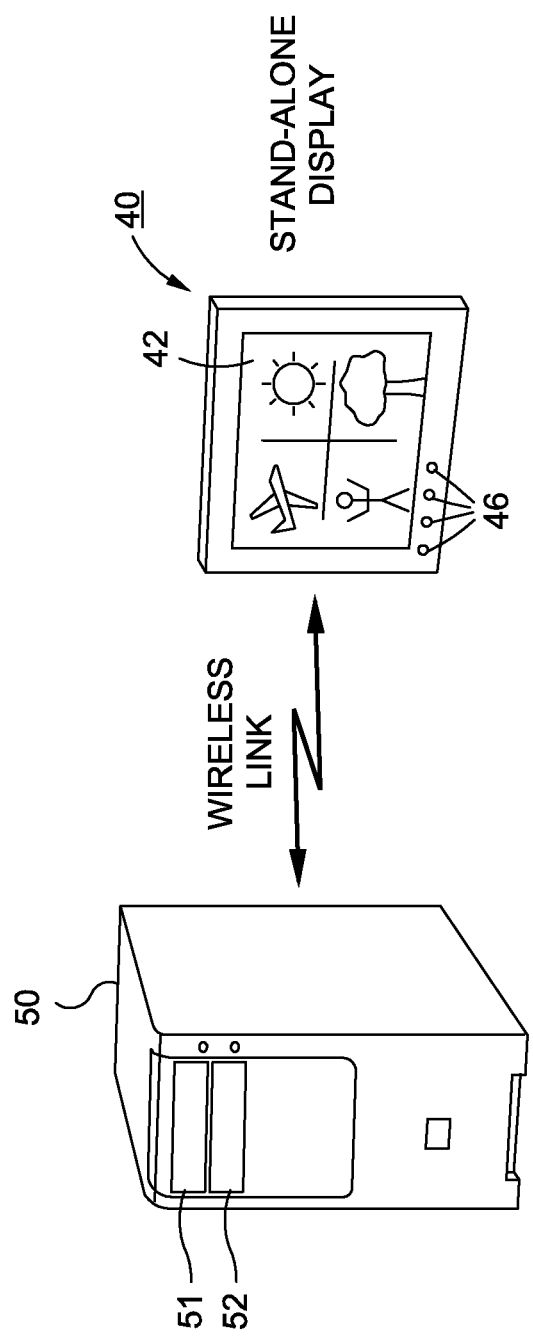
FIG. 1 is a representative view of computing equipment relevant to one example embodiment.

FIG. 1 is a representative view of computing equipment and digital devices relevant to one example embodiment. Stand-alone display 40 includes a display screen 42 for displaying a slideshow of objects, and a series of input keys 46 functioning as a user interface.

Stand-alone display 40 also is connected via a wireless link to remote storage 50 including computer fixed disk 51 and DVD disk drive 52, which are constructed to store images, documents, videos, and other media for display in a slideshow on stand-alone display 40. In that regard, while stand-alone display 40 includes a local memory for storing objects such as images and other media, in some cases it may be more practical to store a collection of media in a remote storage. DVD disk drive 52 provides a means whereby stand-alone display 40 can display image data stored on removable memory media. Other devices for accessing information stored on removable or remote media may also be provided. Of course, stand-alone display 40 may acquire digital image data from other sources such as a digital video camera, a local area network, or the Internet via a network interface. Likewise, stand-alone display 40 may interface with other output devices, such as color output devices accessible over a network interface.

While FIG. 1 depicts stand-alone display 40 as a stand-alone display, computing equipment for practicing aspects of the present disclosure can be implemented in a variety of architectures, including, for example, a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions, a digital camera, an ultra-mobile computer, a netbook, a cell phone, a portable media player, or a game console, among many others.

In addition, while FIG. 1 displays a generic slideshow of images, it should be understood that a slideshow of multiple objects and corresponding display intervals could be adapted to a variety of applications, such as shuffling advertisements on a display (e.g., ads in a web browsers), shuffling security camera displays, shuffled viewing of multiple online games, shuffling news displays of various modes, shuffling live image clips from media channel guides displaying programs by clusters of genre and/or user preferences, shuffling visual television or other program guides for various media channels, or shuffling an informational board for a stock ticker tracker, airline information, web cams, or traffic monitors, among many others.

Figure 2:
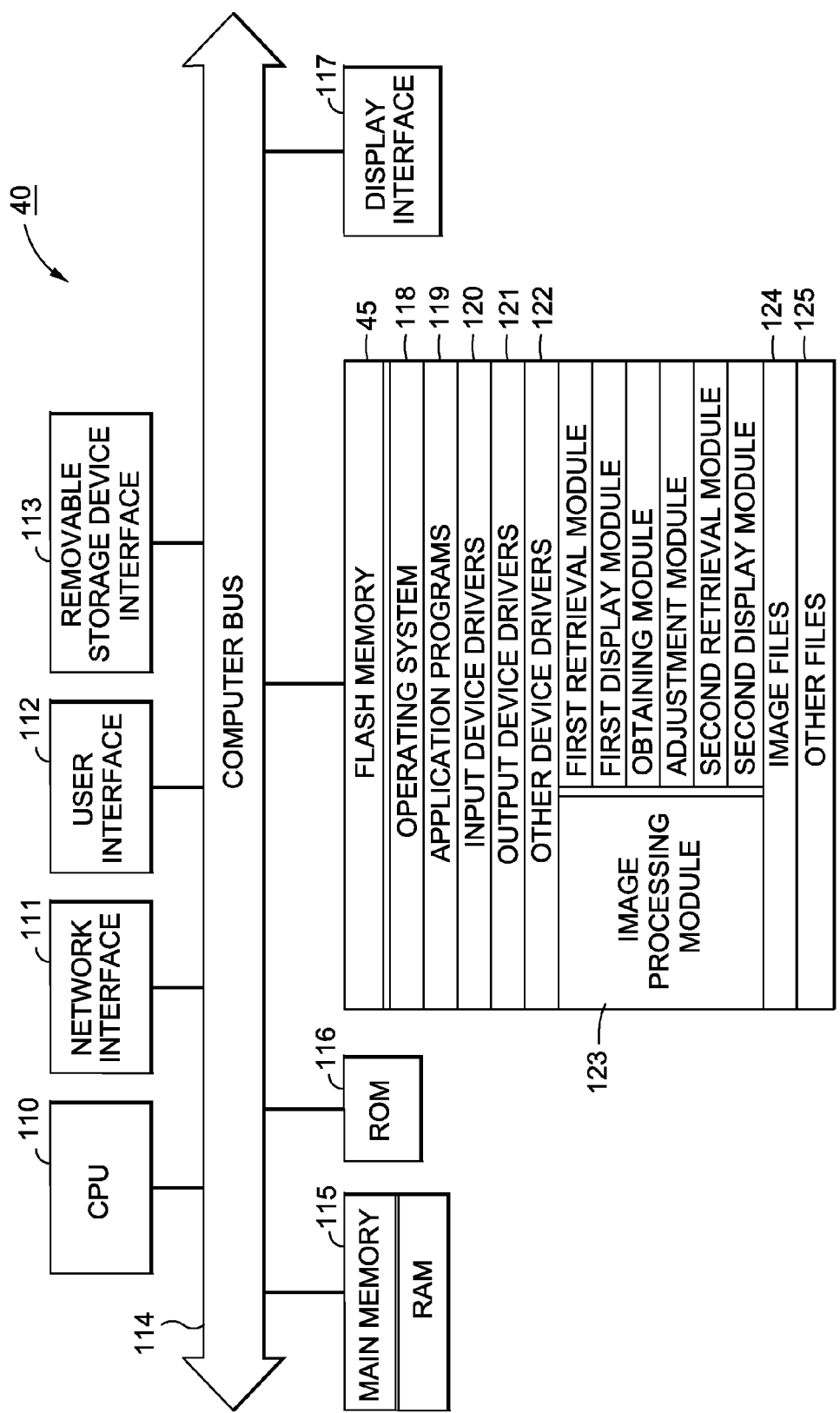
FIG. 2 is a detailed block diagram depicting the internal architecture of the host computer shown in FIG. 1.

FIG. 2 is a detailed block diagram showing the internal architecture of stand-alone display 40. As shown in FIG. 2, stand-alone display 40 includes central processing unit (CPU) 110 which interfaces with computer bus 114. Also interfacing with computer bus 114 are flash memory 45, network interface 111, random access memory (RAM) 115 for use as a main run-time transient memory, read only memory (ROM) 116, display interface 117 for display screen 42, user interface 112 for connecting to user interface elements such as input keys 46 or a touchscreen, and removable storage device interface 113 for interfacing with removable storage media such as a memory card.

RAM 115 interfaces with computer bus 114 so as to provide information stored in RAM 115 to CPU 110 during execution of the instructions in software programs such as an operating system, application programs, image processing modules, and device drivers. More specifically, CPU 110 first loads computer-executable process steps from flash memory 45, or another storage device, into a region of RAM 115. CPU 110 can then execute the stored process steps from RAM 115 in order to execute the loaded computer-executable process steps. Data such as color images or other information can be stored in RAM 115, so that the data can be accessed by CPU 110 during the execution of computer-executable software programs, to the extent that such software programs have a need to access and/or modify the data.

As also shown in FIG. 2, flash memory 45 contains computer-executable process steps for operating system 118, and application programs 119, such as graphic image management programs. Flash memory 45 also contains computer-executable process steps for device drivers for software interface to devices, such as input device drivers 120, output device drivers 121, and other device drivers 122. In some cases, operating system 118 may be a special-purpose operating system which interfaces with hardware directly without the need for separate drivers. Image files 124, including color images for display in a slideshow, and other files 125 are available for output to output devices and for manipulation by application programs.

Image processing module 123 comprises computer-executable process steps, and generally comprises a first retrieval module, a first display module, an obtaining module, an adjustment module, a second retrieval module, and a second display module. Image processing module 123 retrieves a selection of objects, and displays the objects in a slideshow according to a shuffle interval. More specifically, image processing module 123 comprises computer-executable process steps executed by a computer for causing the computer to perform a method for selecting objects for display in a slideshow and adjusting a shuffle interval for each object according to the characteristics of the current display or the characteristics of the group of objects the object belongs to, as described more fully below.

The computer-executable process steps for image processing module 123 may be configured as a part of operating system 118, as part of an output device driver, or as a stand-alone application program such as an image management system. They may also be configured as a plug-in or dynamic link library (DLL) to the operating system, a device driver, or an application program. For example, image processing module 123, according to example embodiments, may be incorporated in an output device driver for execution in a computing device, embedded in the firmware of an output device such as display screen 42, a camera or other mobile device, or provided in a stand-alone image management application. It can be appreciated that the present disclosure is not limited to these embodiments and that the disclosed image processing module 123 may be used in other environments in which image management is used.

Figure 3:
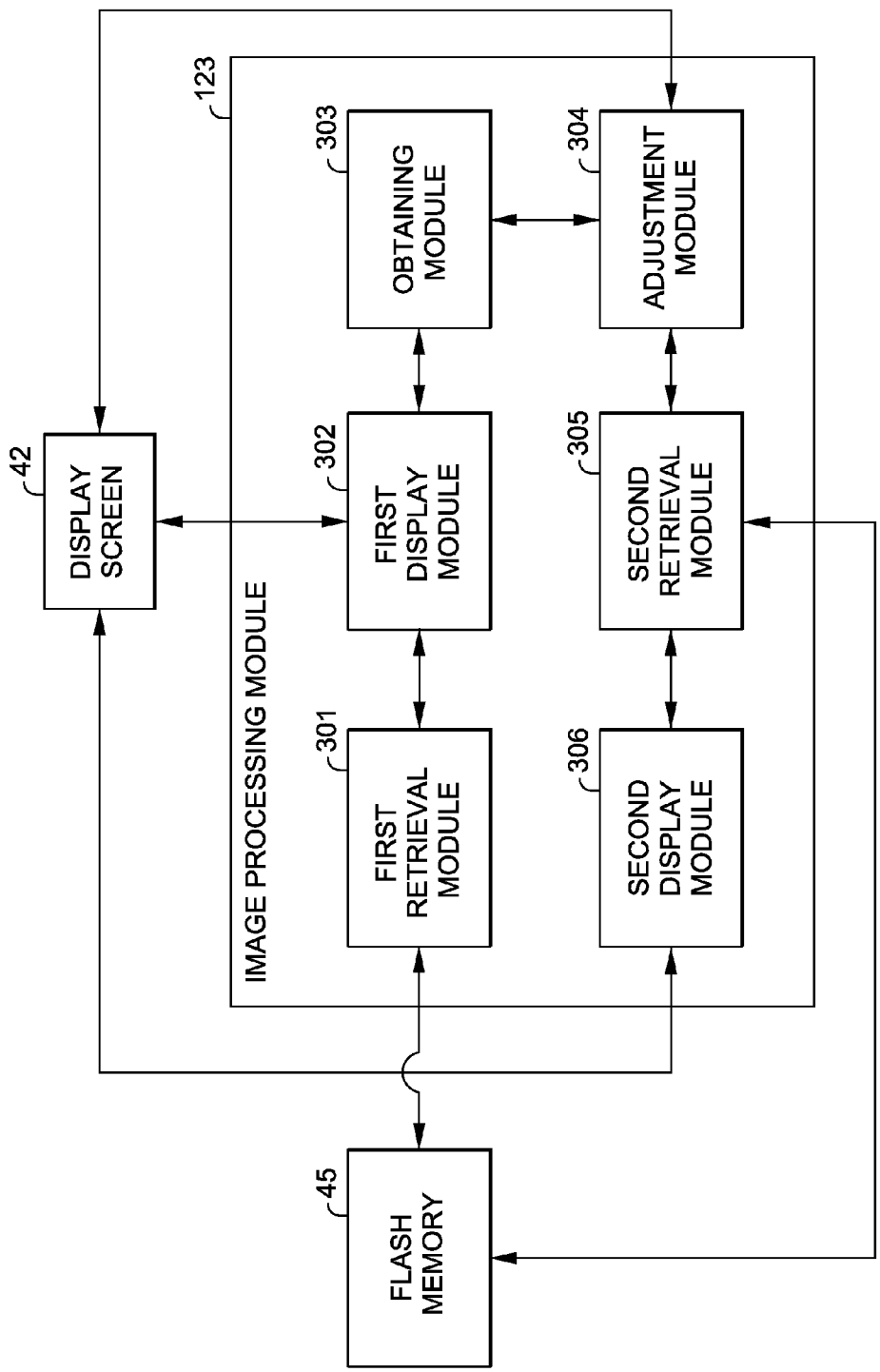
FIG. 3 is a representational view of an image processing module according to an example embodiment.

FIG. 3 illustrates the image processing module of FIG. 2 according to an example embodiment.

In particular, FIG. 3 illustrates an example of image processing module 123 in which the sub-modules of image processing module 123 are included in flash memory 45. Each of the sub-modules are computer-executable software code or process steps executable by a processor, such as CPU 110, and are stored on a computer-readable storage medium, such as flash memory 45 or RAM 115. More or less modules may be used, and other architectures are possible.

As shown in FIG. 3, image processing module includes first retrieval module 301 for retrieving a first selection of one or more objects from amongst a collection of plural objects stored in a data storage device, such as flash memory 45. In that regard, the "objects" may be images, but may also be other types of media such as video clips, clip art, animations, or documents. First display module 302 displays (e.g., generates a display and initiates transmission of the display to a display device) the first selection of one or more objects on a display surface of a display device, such as display screen 42. The first selection of one or more objects is displayed. Obtaining module 303 obtains a baseline shuffle interval, and adjustment module 304 adjusts the baseline shuffle interval. Second retrieval module 305 retrieves a second selection of one or more objects from amongst the collection of plural objects stored in the data storage device, such as flash memory 45. Second display module 306 displays the second selection of one or more objects on the display surface of the display device when the first selection of one or more objects has been displayed for at least as long as the adjusted baseline shuffle interval. Each of these functions will be described more fully below.

Figure 4:
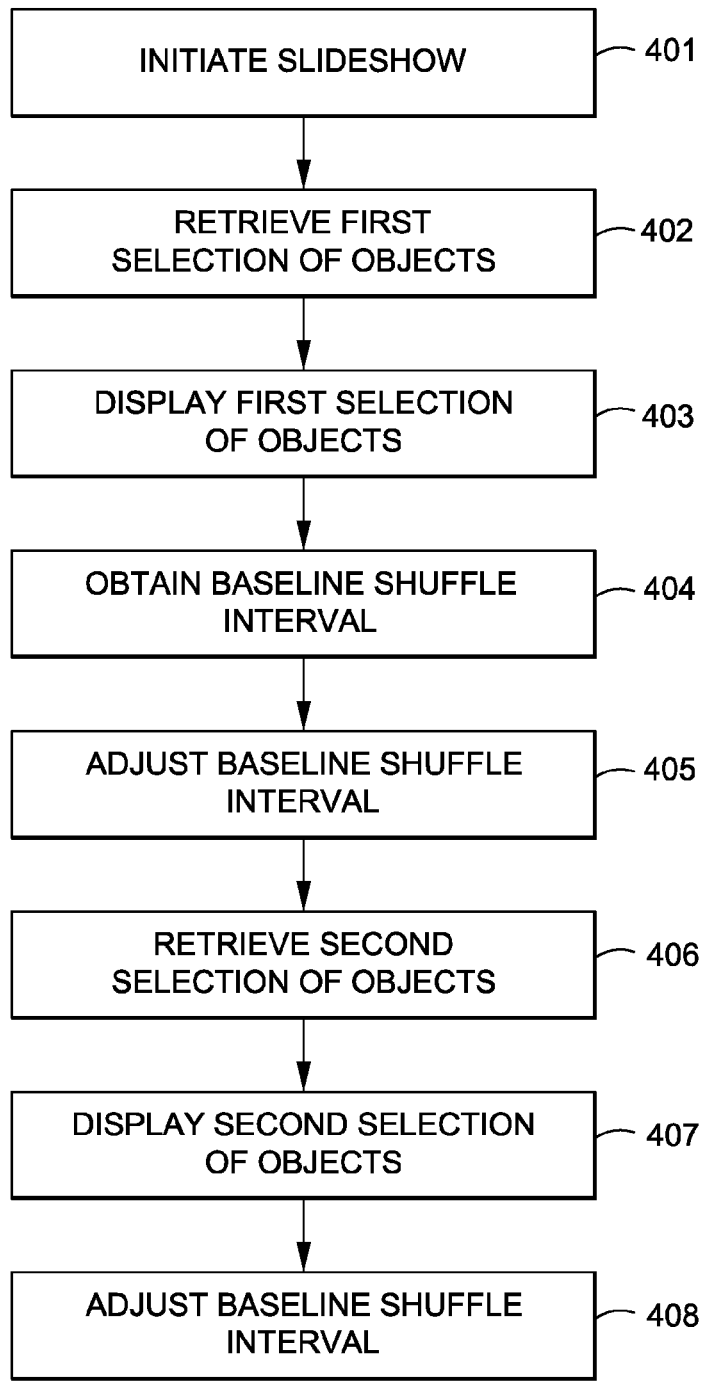
FIG. 4 is a flow diagram for explaining display of a slideshow according to an example embodiment.

FIG. 4 is a flow diagram for explaining display of a slideshow according to an example embodiment.

Briefly, in FIG. 4, a baseline shuffle interval is adjusted in a slideshow which displays multiple objects. A first selection of one or more objects is retrieved from amongst a collection of plural objects stored in a data storage device. The first selection of one or more objects is displayed on a display surface of a display device, and may be displayed based on a first display attribute. A baseline shuffle interval is obtained. The baseline shuffle interval is adjusted based at least in part on the first display attribute. A second selection of one or more objects is retrieved from amongst the collection of plural objects stored in the data storage device, and the second selection of one or more objects is displayed on the display surface of the display device when the first selection of one or more objects has been displayed for at least as long as the adjusted baseline shuffle interval.

In more detail, in step 401, the slideshow is initiated. The slideshow may be initiated automatically, e.g., upon startup of stand-alone display 40, or may be initiated by a user, for example from an application running stand-alone display 40.

In step 402, a first selection of one or more objects is retrieved from amongst a collection of plural objects stored in a data storage device. Thus, for example, a group of images may be selected from a collection of images stored in a memory, such as flash memory 45.

In one embodiment, respective objects may be organized into clusters, and representative objects of each cluster are selected for simultaneous display in one slideshow. Alternatively, a slideshow may be displayed of multiple representative objects from the same cluster. Respective clusters may be mutually exclusive sets of objects (i.e., not drawn from the same set of objects). Alternatively, some of the clusters might be mutually exclusive whereas others are not. For example, assuming a slideshow with four concurrently displayed objects A, B, C, and D, objects A and B might be drawn from mutually exclusive clusters which nonetheless may have some object overlap with the clusters from which objects C or D are drawn. In another example, clusters may have some different objects or object types but may not be entirely mutually exclusive of each other. Processes for clustering and selecting representative objects from a cluster are described in more detail in U.S. application Ser. No. 12/906,106, filed Oct. 17, 2010, titled "Data Clustering", by Bradley Scott Denney et al., and in U.S. application Ser. No. 12/906,107, filed Oct. 17, 2010, titled "Selecting Representative Images For Display", by Bradley Scott Denney et al, the contents of which are incorporated herein by reference. Of course, objects do not need to be clustered to perform the processes described herein, and the slideshow may simply be generated from a single collection or multiple collections of objects, or other storage arrangements.

In step 403, the first selection of one or more objects is displayed on a display surface of a display device based on a first display attribute. Accordingly, for example, a set of images may be displayed on display screen 42 as shown in FIG. 1.

In that regard, the first display attribute represents characteristics of the current display on the display device. For example, the first display attribute can include at least one attribute selected from attributes which include the number of concurrently displayed objects, the multimedia type(s) of displayed objects or any concurrently displayed objects, the dimensions of the displayed object(s) relative to full dimensions of the display surface, the dimensions of a display area on the display device for the object(s), the dimensions of the displayed object(s) relative to the dimensions of any other concurrently displayed objects, the dimensions of a display area on the display device for the object(s) relative to the dimensions of the display areas for any other concurrently displayed object(s), and the dimensions of the displayed objects relative to full dimensions of the objects as stored in a memory of the display device (e.g., before being shrank or enlarged to fit in the slideshow and/or screen of the display device).

Furthermore, the first display attribute may relate to the content of the displayed objects. Additionally, the first display attribute may relate to the attributes of the other display objects. In these embodiments, the attributes of the objects may depend on each other and may need to be solved iteratively. For example, the content could be measured via the similarity among the displayed objects as measured on a pixel by pixel basis or according to a similarity measure based on object features related to characteristics such as shape, color, texture, and so on. In addition, the content could relate to a measurement of image complexity, or the content could relate to a relevance to a topic category or relevance to a predetermined or calculated object.

In step 404, a baseline shuffle interval is obtained, which may be used to shuffle the display of one or more images in the slideshow. The baseline shuffle interval may be a default interval, or could be set by a user or by the display device according to desired characteristics or device capabilities.

The slideshow might start with a respective baseline shuffle interval for each object which is a time interval. However, it might be better to change the objects in the slideshow at different intervals, as changing all images at once might be confusing to visually follow. Choosing a random time interval as an adjusted baseline shuffle interval for each object in the slideshow ordinarily will ensure that the objects do not change in unison. A random time interval may be generated using a probability distribution function, e.g., a Poisson distribution, a Gaussian distribution, a log-normal distribution, a Gamma distribution, a Rayleigh distribution, a Skellam distribution, a continuous uniform distribution, and an exponential distribution. Therefore, in this example, the adjusted baseline shuffle interval could be a random time interval that is generated based on a probability distribution. A baseline shuffle mean may be used as a parameter (e.g., a mean) in the probability distribution function that is used to generate a baseline shuffle interval.

In step 405, the baseline shuffle interval is adjusted based at least in part on the first display attribute. Thus, the interval of the slideshow is adjusted based on the characteristics of the current display on the display device. In particular, the baseline shuffle interval is adjusted based on at least one attribute selected from attributes which include the number of concurrently displayed objects, the multimedia type(s) of the displayed object or any other concurrently displayed objects, the dimensions of the displayed object(s) relative to full dimensions of the display surface, the dimensions of a display area on the display device for the object(s), the dimensions of the displayed object(s) relative to the dimensions of any other concurrently displayed objects, the dimensions of a display area on the display device for the object(s) relative to the dimensions of the display areas for any other concurrently displayed object(s), and the dimensions of the displayed objects relative to full dimensions of the objects as stored in a memory of the display device.

As discussed below, an adjusted baseline shuffle interval is used to trigger a change in one or more displayed objects from the first selection of one or more objects to a second selection of one or more objects. Put another way, an adjusted baseline shuffle interval indicates how long one or more respective objects from the first selection of objects should remain on the screen before being replaced by one or more objects from the second selection. Thus, in the examples that follow, the "second selection" refers to another selection of one or more objects which is displayed once the adjusted baseline shuffle interval has elapsed.

In one example, the baseline shuffle interval might be adjusted based on the number of concurrently displayed objects. In particular, assuming a slideshow in which all objects are images, the slideshow might display multiple images on a grid of K by K images. When K=1, the displayed image might be shuffled every T seconds (on average). When K=2, there are four images being displayed at a time and a respective image of the four images could be shuffled at one quarter the speed (on average) of the one image shuffle speed. This would cause, on average, one image in the entire display to change at the same rate as a single image changes. Alternatively, a respective image of the four images could be shuffled at one half of the speed (on average) of the one image shuffle speed. This approach might be visually more pleasing since the eye tracks each of the two dimensions independently. Of course, the slideshow does not need to be organized as a grid, and other layouts are possible.

As mentioned above, in a slideshow of multiple objects, the individual objects might be set to change at different intervals. In such an example asynchronous display process, N (N is greater than one) objects can be selected in each of the first and second selections of one or more objects, all N objects of the first selection of one or more objects can be displayed asynchronously, and all N objects of the second selection of one or more objects can be displayed asynchronously, and the baseline shuffle interval can be adjusted based in part by multiplying the baseline shuffle interval by a factor of 1/N. Alternatively, the objects could be timed to all change in unison, for example in cases where such changing is not visually distracting, or for example in cases where the change is intended to capture a viewer's attention. Thus, in an example synchronous display process in which the objects have the same baseline shuffle interval and phase, N (N is greater than one) objects can be selected in each of the first and second selections of one or more objects, all N objects of the first selection of one or more objects can be displayed synchronously, all N objects of the second selection of one or more objects can be displayed synchronously, and the baseline shuffle interval can be adjusted based in part by multiplying the baseline shuffle interval by a factor of 1/N.

Another baseline shuffle interval adjustment may be based on how the dimensions of the object are scaled for display, e.g., the scale of the object as displayed in the slideshow with respect to its original full size as stored in memory. In that regard, in order to display the images in the slideshow, it may be necessary to scale the dimensions of each image from the original full dimensions of the image as stored in memory.

The baseline shuffle interval could be adjusted based on such scaling of the images, combined with, for example, an adjustment based on the number of displayed images. Thus, in one example, N (N is greater than one) objects are selected in each of the first and second selections of one or more objects, and each of the objects is displayed at a scaling of 1/N relative to full dimensions of the objects as stored in the data storage device. Moreover, in such an example, the baseline shuffle interval can be adjusted based in part on the 1/N dimensions of the displayed objects relative to full dimensions of the objects as stored in the data storage device.

The dimensions of the displayed object(s) relative to the full dimensions of the object(s) as stored in the data storage device can, in some instances, be a proxy for image quality. For example, if a low resolution image (e.g., an image with low pixel density) is expanded to a much larger size for display in the slideshow, the image quality might suffer, and thus the baseline shuffle interval might be increased to compensate for such reduced quality. Conversely, the interval might be decreased so that the lack of quality is not as noticeable to a viewer. Of course, the baseline shuffle interval could be adjusted based on other proxies for image quality, such as pixel density.

The baseline shuffle interval could also be adjusted based on the relative dimensions of a displayed object as compared to another object (or objects) in the display, or as compared to the dimensions of the entire display screen.

In still another example, objects in mixed-mode multimedia (images, artwork, video clips, documents, etc.) slideshows could take on different intervals based on baseline single multimedia object display shuffle intervals, or could be combined with other attributes such as those described above to form a composite adjustment.

Turning to some concrete examples, let $T_m$ be the baseline shuffle interval of the $m^{th}$ multimedia object, of object type (m). A modification $f_m$ to the baseline shuffle interval for the $k^{th}$ shuffling display could reflect one or more of the object type (m), the number of objects concurrently being displayed (N), the scale of the object with respect to its full size in memory (s), and the set of other objects' multimedia type and scale $\{m_i, s_i : i \neq k\}$, such as $t_k = T_m f_m(N, s_k, \{m_i, s_i : i \neq k\})$.

$f_m$, of course, could represent any number of functions based on one or more of the above variables.

As discussed above, $f_m$ could simply be a function of the number of objects concurrently being displayed, such as $$f_m(N, s_k, \{m_i, s_i : i \neq k\}) = \frac{1}{N}, \text{ or}$$

$$f_m(N, s_k, \{m_i, s_i : i \neq k\}) = \sqrt{\frac{1}{N}}.$$

In another example, $f_m$ could reflect the size of the currently displayed object ($s_k$) as compared with the size of the entire display of the display device:

$$f_m(N, s_k, \{m_i, s_i : i \neq k\}) = s_k.$$

In an alternative formulation, $f_m$ could reflect the size of the currently displayed object as compared with the size of all of the other objects in the slideshow:

$$f_m(N, s_k, \{m_i, s_i : i \neq k\}) = \frac{s_k}{\sum_{i \neq k} s_i}.$$

In still another example $f_m$ might be based on some combination of the number of objects/slideshows being displayed and the size of each slideshow. For example, each baseline shuffle interval would be adjusted based on the size and interval of the corresponding slideshow relative to the size and interval of the other slideshows in the display, altered by a user-set parameter α, such as:

$$f_m(N, s_k, \{m_i, s_i : i \neq k\}) = \left(\frac{s_k T_{m_k}}{\sum_{i \neq k} s_i T_{m_i}}\right)^\alpha.$$

In the equation above, decreasing α would cause the user to have less effect on the interval, whereas increasing α would lead to more user effect. The parameter α could be set, for example, by a preference slider element for the entire display, for each multimedia type, or for each object, in which the user slides a pointer to one direction or another or clicks a direction to increase or decrease the interval for that object. Moreover, a user could rate interest in each of different types of objects (image, artwork, documents, video), or the system could analyze a user's history of how long a user has watched a particular type of media, or how a user has rated a particular type of media. Thus, for example, an adjustment to $T_{m1}$ might be ($T_{m1}$ g(user rating)), where g is a function which defines a shuffle speed according to a user's rating of the media type m, such as rating movies as more important than documents. In one such example, a slider element could encode a user rating from 0 to 10 and the function of the user rating could be $g(r) = b^{(r-5)/10}$, where b is some predetermined value (e.g., b=4). An example of such an interface is described more fully below with respect to FIG. 5. Other media-type dependent adjustments might be pre-set (e.g., shuffle clip art more quickly than movies). The parameter α could even be used for obtaining a baseline shuffle interval, prior to any adjustment.

In addition to α, other parameters could be added to reflect user preference. These parameters could be potentially influenced at the individual display levels or at groups of individual displays to reflect some local user preference or historical user browsing focus. For example, the system could track a TV program guide where the user routinely skips over some program channels and spends more time on others. In this case the display or the group of displays might have its own modified base interval adjusted in an attempt to compensate for the user's focus on particular channels or channel types.

Additionally, in animated displays, additional features such as the temporal rate of image changes can be detected as an additional parameter that could be used when calculating the interval of other display changes. Alternatively, the baseline shuffle interval could be set to synchronize to audio, such as music. In this case the modifications to the baseline shuffle interval could be done using rational scales such that the scaled slideshows also synchronize to the music.

Another set of adjustments could be based on the characteristics of the stored objects, as opposed to only characteristics of objects being currently displayed.

In particular, the collection of plural objects can be stored with a first storage attribute, and in the adjusting step, the baseline shuffle interval can be adjusted based at least in part on the first storage attribute. The first storage attribute can include at least one attribute selected from attributes which include the total number of objects in the collection, the multimedia type of objects in the collection, or other statistics measuring the distribution and characteristics of objects in the collection.

For example, the baseline shuffle interval can be adjusted by decreasing the baseline shuffle interval for collections of objects that are relatively larger, and by increasing the baseline shuffle interval for collections of objects that are relatively smaller. Intervals could also be adjusted based on the similarity of objects in the collection. For example, the baseline shuffle interval could be shortened for images that are similar, and lengthened for images that are more different. In another example, the interval could be changed for the current object in anticipation of the similarity of the next object selected, or based on the similarity of the current object with the prior corresponding object selection.

As a different example of a collection relative dependent slideshow interval, the baseline shuffle interval can be adjusted to depend on the consistency or variability of the collection of items to be displayed. In this example, a measure of collection variability is performed based on features extracted from the objects in the collection. One such measure is the standard deviation of the features of objects in the collection (computed relative to the other collections). Another is the sum of the squares of the within-collection feature dissimilarities.

Still further, the baseline shuffle interval can be adjusted based on the variability of the collection of items and the current items relevancy to the collection. As an example, an object that is an outlier (e.g. large distance to the mean divided by the standard deviation) to the collection could be displayed for a longer time than an inlier due to the uniqueness of the object. Conversely, in some situations, outliers might be given less time to be displayed since in some cases, they are not considered to be important members of the collection or are consider less confidently as being "true" members of the collection.

In any of the above examples of adjusting the baseline shuffle interval, the baseline shuffle interval can be a random variable whose distribution is at least in part a function of one or more other baseline shuffle parameters. The adjusted baseline shuffle interval can also be a random variable, and in such a case the parameters of the distribution used to generate the adjusted baseline shuffle interval may include one or more baseline shuffle parameters (which may include the baseline shuffle interval), where the adjustment may be based at least in part on the display and/or collection attributes. In an example embodiment the adjusted baseline shuffle interval is random and drawn from a Poisson distribution with a mean of the baseline shuffle interval.

More generally, intervals of all objects being displayed can be drawn from a joint distribution where the joint distribution parameters are in part dependent on display and/or collection attributes and the baseline shuffle intervals. This would allow some dependency on the intervals between displays of objects based on display and/or group attributes. For example, the intervals would not necessarily need to be independent (e.g., the intervals could be locally dependent so that neighboring slideshows are more likely to change together or, conversely, so that neighboring slideshows are less dependent so as to avoid local synchronicity effects).

Returning to FIG. 4, in step 406, a second selection of one or more objects is retrieved from amongst the collection of plural objects stored in the data storage device (e.g., flash memory 45).

In some cases, some objects in the first selection of one or more objects are repeated in the second selection of one or more objects, such that the repeated objects are cycled through the display. In other cases, no objects in the first selection of one or more objects are repeated in the second selection of one or more objects, such that the objects displayed from the first selection of one or more objects are mutually exclusive of the objects displayed from the second selection of one or more objects.

In step 407, the second selection of one or more objects is displayed on the display surface of the display device, when the first selection of one or more objects has been displayed for at least as long as the adjusted baseline shuffle interval. Thus, the second selection of objects is displayed once the adjusted baseline shuffle interval for the first selection of one or more objects has elapsed.

In one example, the second selection of one or more objects is displayed with a second display attribute identical to the first display attribute. In another example, the second selection of one or more objects is displayed with a second display attribute different from the first display attribute, such that the display format changes.

In step 408, the baseline shuffle interval may again be adjusted, based on the objects being displayed.

Figure 5:
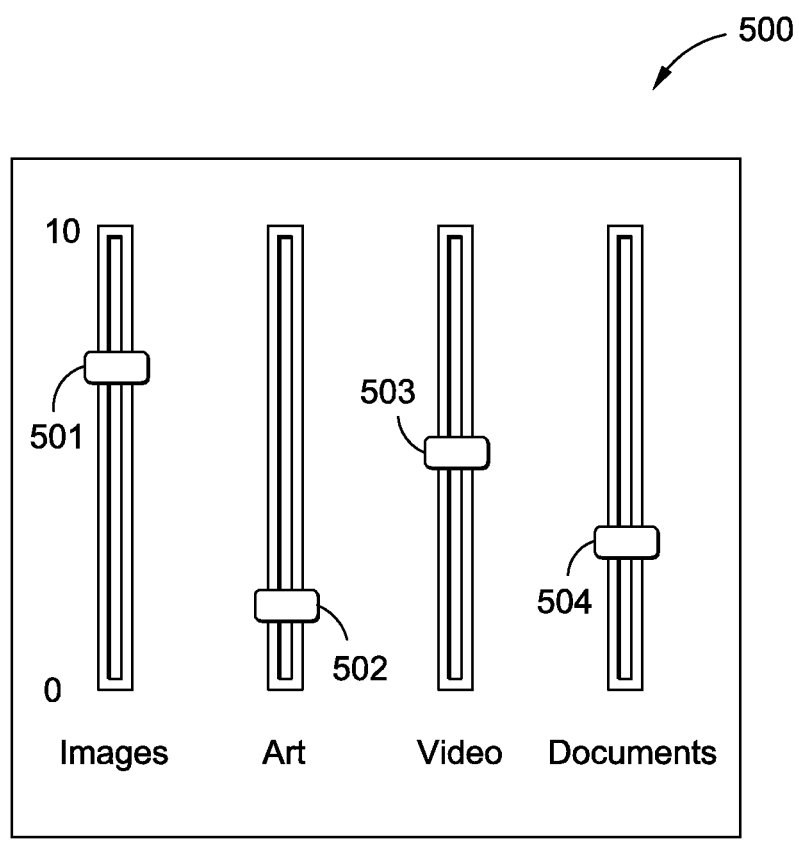
FIG. 5 is a representative view of a user interface for controlling the relative timing of various document types according to an example embodiment.

FIG. 5 is a representative view of a user interface for controlling the relative timing of various object types according to an example embodiment.

In particular, FIG. 5 depicts one example of a user interface 500 that includes sliders 501 to 504. In this example, the relative positions of the sliders 501 to 504 are used to adjust one or more shuffle speeds. Specifically, by using the sliders 501 to 504, a user can rate the importance of each object type. As shown in FIG. 5, the user has rated images as the most important object type, followed by video, documents, and art. As discussed above, the ratings from 0 to 10 can be inputs to a user function such as $g(r)=b^{(r-5)/10}$, where b is some predetermined value (e.g., b=4), and a baseline shuffle interval can be adjusted based on $g(r)$. Thus, a user interface is provided to rate the relative importance of one or more object types, and the baseline shuffle interval is adjusted at least in part on the user rating. Naturally, it should be understood that other types of user interfaces and other formulas for adjustment of shuffle intervals based on ratings of object type are possible.

By displaying one or more objects according to a baseline shuffle interval which is adjusted based on display attributes, it is ordinarily possible to provide a user with the ability to view a slideshow which displays one or more objects at the same time, while tailoring the shuffling of the one or more objects to a speed appropriate for the conditions of the objects being displayed and/or of the display.

According to other embodiments contemplated by the present disclosure, example embodiments may include a computer processor such as a single core or multi-core central processing unit (CPU) or micro-processing unit (MPU), which is configured to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (which may also be referred to as computer-executable instructions or computer-executable code) to perform some or all of the above-described functions. The computer-executable program may be pre-stored in the computer processor(s), or the computer processor(s) may be functionally connected for access to one or more non-transitory computer-readable storage media on which the computer-executable instructions are stored. For these purposes, access to the non-transitory computer-readable storage media may be a local access such as access via a local memory bus structure, or may be a remote access such as access via a wired or wireless network (including the Internet). The computer processor(s) may thereafter be operated to execute the computer-executable program or instructions to perform operations or functions of the above-described embodiments.

A non-transitory computer-readable storage medium on which computer-executable instructions or a program may be stored include a wide variety of tangible storage devices which are constructed to retrievably store data, including, for example, any of a magnetic disk (e.g., a flexible disk (floppy disk), a hard disk, redundant array of independent disks (RAID)), an optical disc (e.g., CD, DVD, Blu-ray), a magneto-optical disk, a micro-drive, a read only memory (ROM), solid state memory (e.g., random access memory (RAM), DRAM, SRAM, flash memory, video RAM (VRAM), a non-volatile memory card), erasable programmable read only memory (EPROM), electrically erasable programmable read only memory (EEPROM), a magnetic tape or card, an optical card, a nanosystem, a molecular memory integrated circuit, a storage of distributed computing systems, and the like. A storage medium may be a function expansion unit removably inserted in and/or remotely accessed by the apparatus or system for use with the computer processor(s).

Figure 6:
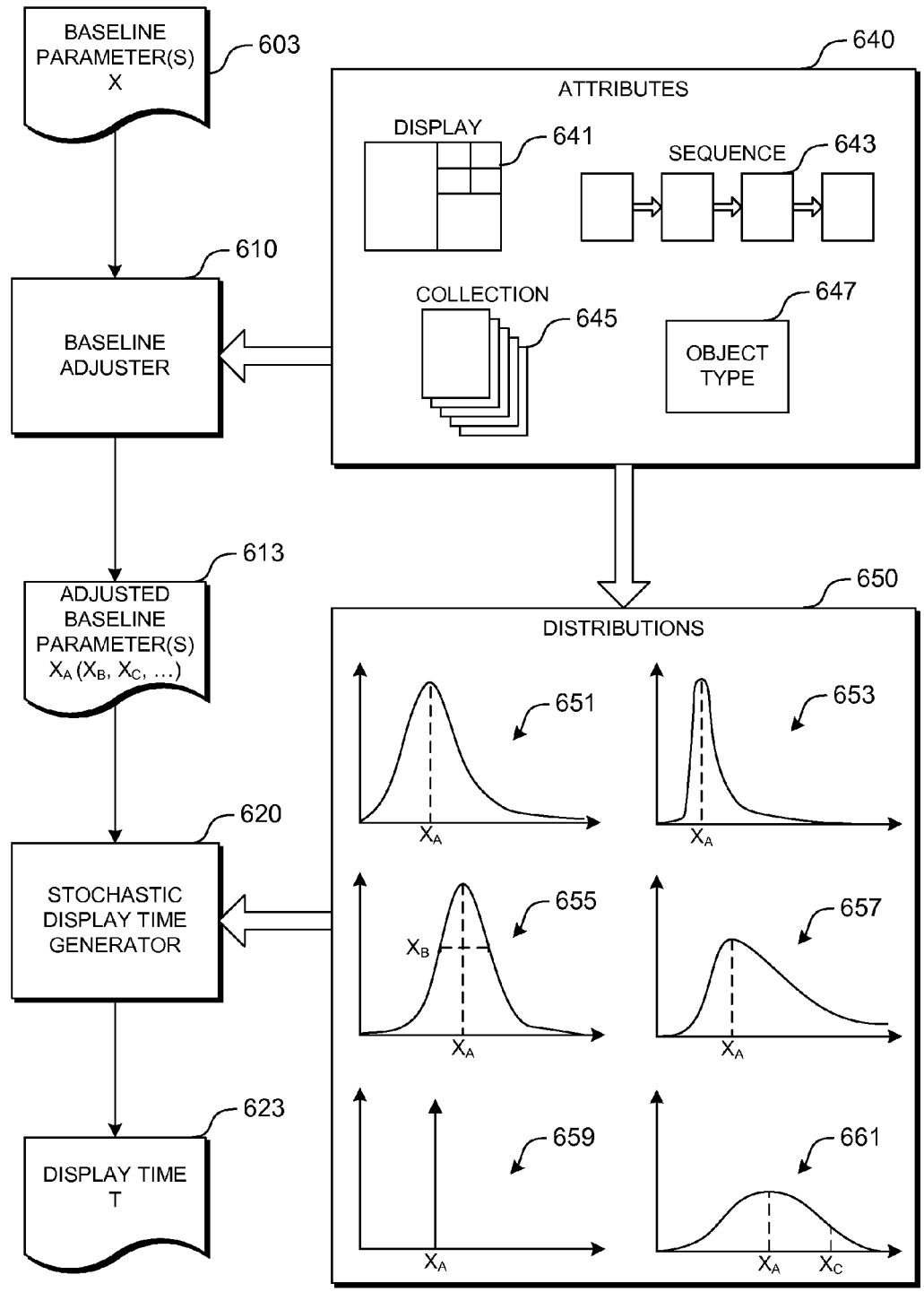
FIG. 6 is a block diagram that illustrates the flow of an embodiment of generating a display time for an object.

FIG. 6 is a block diagram that illustrates the flow of an embodiment of generating a display time for an object. In FIG. 6, a baseline parameter(s) X 603 (which may be one or more parameters) are input to a baseline adjuster 610. The baseline adjuster 610 (which may implement an algorithm, a function, etc.) may use the baseline parameter(s) X as input parameters to generate adjusted baseline parameter(s) $X_A$ ($X_B$, $X_C$, . . . ). The baseline adjuster 610 may base (e.g., use as inputs, as parameters) the adjustment on various attributes 640. The attributes 640 may include display attributes 641 (e.g., attributes of a display device, attributes of a display rendered on a display device (including number of objects, size of objects, size of portions of the display that show respective objects, number of objects shown on the display, type of objects on the display, clusters associated with objects on the display, and content of objects on the display), attributes of the display sequence 643 of objects (e.g., the object that were previously presented, and the objects expected to be presented afterwards, either anywhere on the display or in a particular portion of the display), attributes of the collections of objects 645, and attributes of the object type 647.

The adjusted baseline parameter(s) $X_A$ 613 are then used by a stochastic display time generator 620 to generate a display time T 623. The stochastic display time generator 620 may use one or more distributions to generate the display time T 623. The distributions may include, for example, a Poisson distribution 651, a Gaussian distribution 655, a log-normal distribution 653, a Gamma distribution 661, a Rayleigh distribution 657, a Skellam distribution, a Dirac delta distribution 659, a Weibull distribution, a Cauchy-Lorentz distribution, a continuous uniform distribution, and an exponential distribution.

For example, the adjusted baseline parameter(s) $X_A$ 613 may be used by the stochastic display time generator 620 as a mean or a mode of a distribution. Additionally, the attributes 640 and/or other baseline parameters $X_B$, $X_C$, etc. may be used as parameters in a distribution. Accordingly, the distribution may vary based on the number of objects in a collection (e.g., the distribution could be narrowed as the number of objects increases to ensure that all object have nearly equal time, the distribution could be flattened if there are lots of objects with the same subject in the sequence). Thus, objects may have equal adjusted baseline parameters $X_A$ 613 and not have equal display times T 623.

One example is a display that displays in succession images from a collection. The baseline parameters could be adjusted to $X_A$ based on the variation of the images in the collection and adjusted to $X_B$ based on the distance of the current image to the collection mean. The stochastic display time generator can then use a Gamma distribution with the shape parameter based on $X_A$ and the scale parameter based on $X_B$. Such a display may effectively shorten display times (on average) and decrease the variation of display times for similar images but may be more likely to display an anomalous image in the group for a longer period of time.

Figure 7:
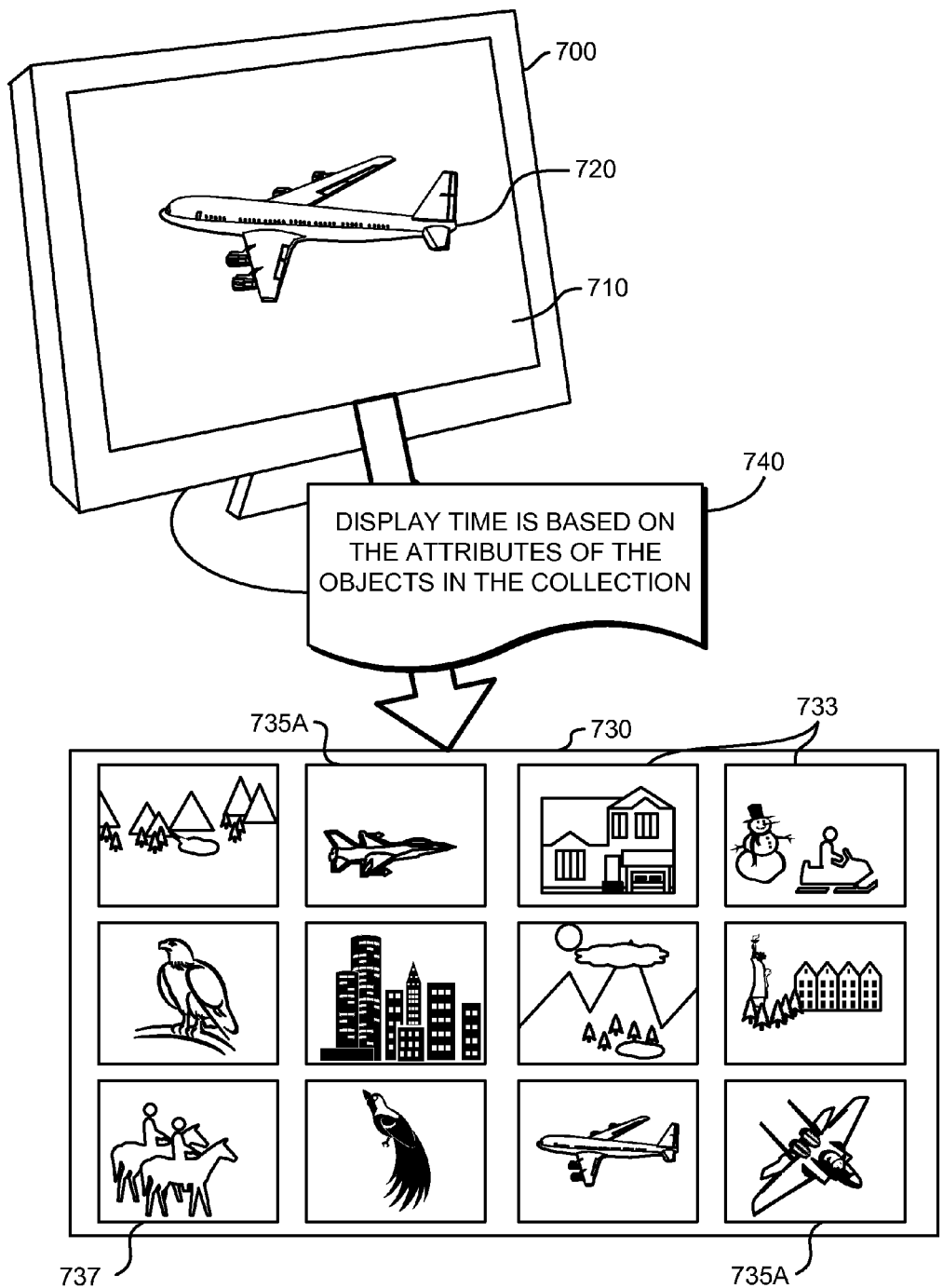
FIG. 7 is a block diagram that illustrates an embodiment of generating a display time for an object on a display device.

FIG. 7 is a block diagram that illustrates an embodiment of generating a display time for an object on a display device. A display device 700 includes a display 710 that displays an object 720. The display time 740 of the object 720 is based on the attributes on objects 733 in a collection of objects 730. The attributes of the objects 733 may include the colors of the object, the morphology of the object, the type of the object (art, photo, video, document, computer aided design (CAD)), the resolution of the object, the size of the object, tags on the object, date the object was created, the subjects of the object (e.g., humans, boats, airplanes, birds, trees, landscapes, plants, buildings, cars, jewelry, any other subject), a user rating of the object, a location of the object, and the type and/or model of the device that generated the object (scanner, camera, lightpad, computer application). Additionally, the display time 740 may be based on attributes of the collection 730, including, for example, the number of objects in the collection, the respective number of different types of objects in the collection, the frequency of addition or removal of objects from the collection, total storage space needed to store the collection, and access time of the device(s) that stores the collection.

For example, the display time 740 for the object 720 may be 1 second because there are two other objects that include aircraft 735A in the collection 730. Also, the display time of an object that includes horses 737 may be 2 seconds because no other objects in the collection 730 include horses. However, the objects that include aircraft (735A, 720) may be displayed for 5 seconds each and the object that includes horses may be displayed for 1 second in embodiments where it is desired for aircraft (e.g., more common or representative objects) to have a longer display time than other objects.

Figure 8:
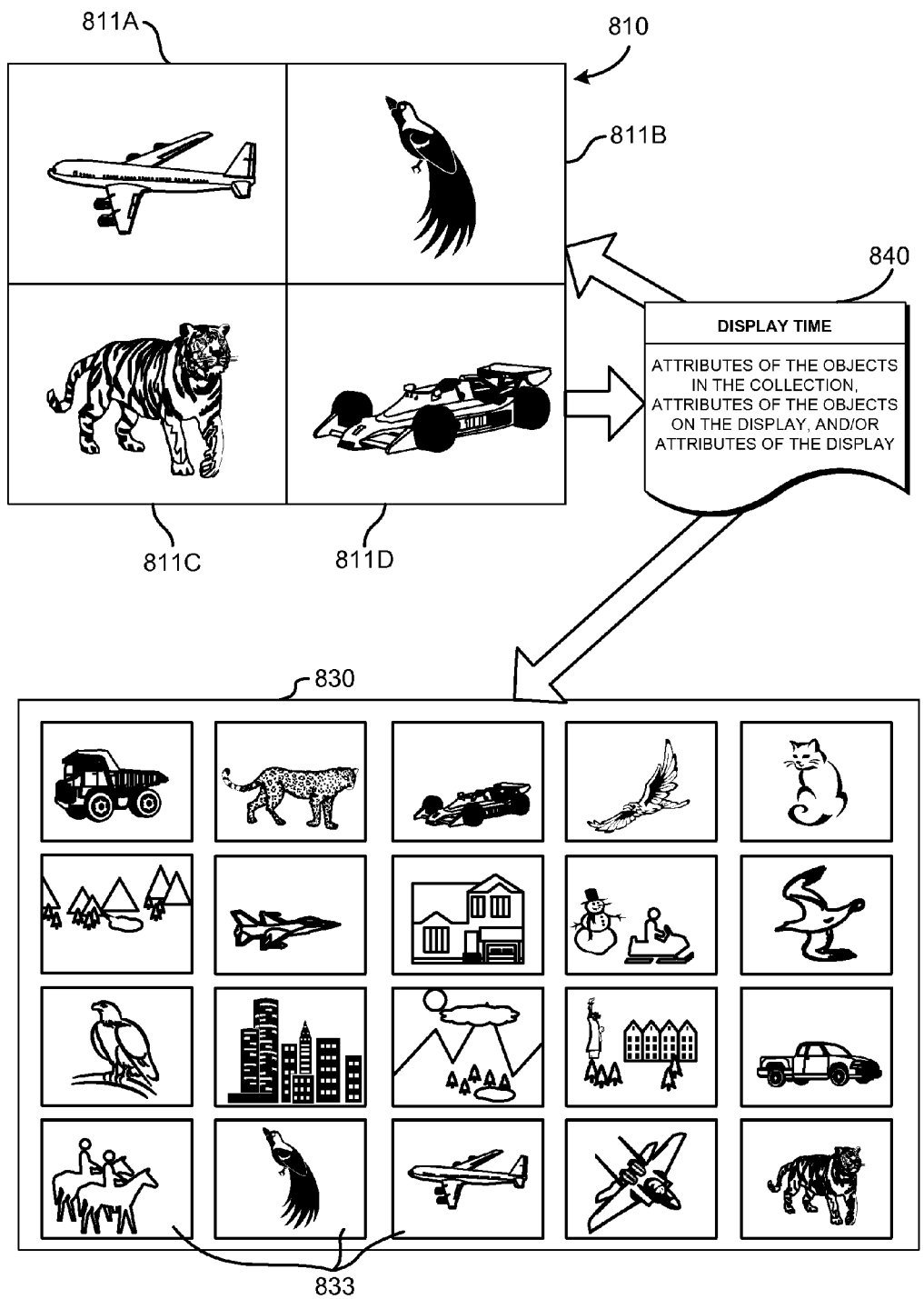
FIG. 8 is a block diagram that illustrates an embodiment of generating display times for respective objects on a display.

FIG. 8 is a block diagram that illustrates an embodiment of generating display times 840 for respective objects on a display 810. The display time 840 of each object is based on attributes of the objects in the collection 830, attributes of the objects on the display 810, and/or on attributes of the display 810. For example, the display time 840 could be based on the four portions 811A-D of the display 810 that show respective objects, and the display time may be increased or decreased as more objects are presented on the display. Using the display 710 from FIG. 7 as a reference, the display time 840 for each of the objects on the display of FIG. 8 may be ½ or ¼ of the display time 740 for the object 720 in the display 710 of FIG. 7. Alternatively, the display time 840 for each of the objects may be 2 or 3 times greater than the display time of the object 720 in FIG. 7. Furthermore, the display time of an object may increase or decrease depending on the other objects that are simultaneously presented on the display 810.

Also using the collection 730 from FIG. 7 as a reference, the display times of the objects 833 in the collection 830 may be less than the display time of the objects 733 in the collection 730 from FIG. 7 because the collection 730 of FIG. 7 includes 12 objects 733, and the collection 830 of FIG. 8 includes 20 objects. Thus, the display times of the objects in FIG. 8 may be decreased, for example to reduce the time necessary to display all of the objects 833 in the object collection 830.

Also for example, the display time of the object in portion 811D may be greater than the respective display times of the objects in portions 811B and 811C if there are fewer objects that include wheeled vehicles in the object collection 830 than objects that include animals. And portions 811B and 811C may have respective shorter display times than portion 811D, for example to permit display of more of the objects in the object collection 830. Also, the display times of the portions 811A-D may vary with each object displayed in the respective portion. For example, the respective display times may vary according to one or more stochastic distribution. Thus, portions 811B-D may have respective display times that vary according to one or more stochastic distribution. Continuing the current example, the mean of the stochastic distribution that is used to generate the respective display times for portions 811B-C may be less than the mean of the stochastic distribution that is used to generate the display times for portion 811D. Therefore, though the display time for an object shown in portion 811D may be less than the display time for an object in portion 811B or 811C, it is more likely that an object shown in portion 811D will have a greater display time.

Figure 9:
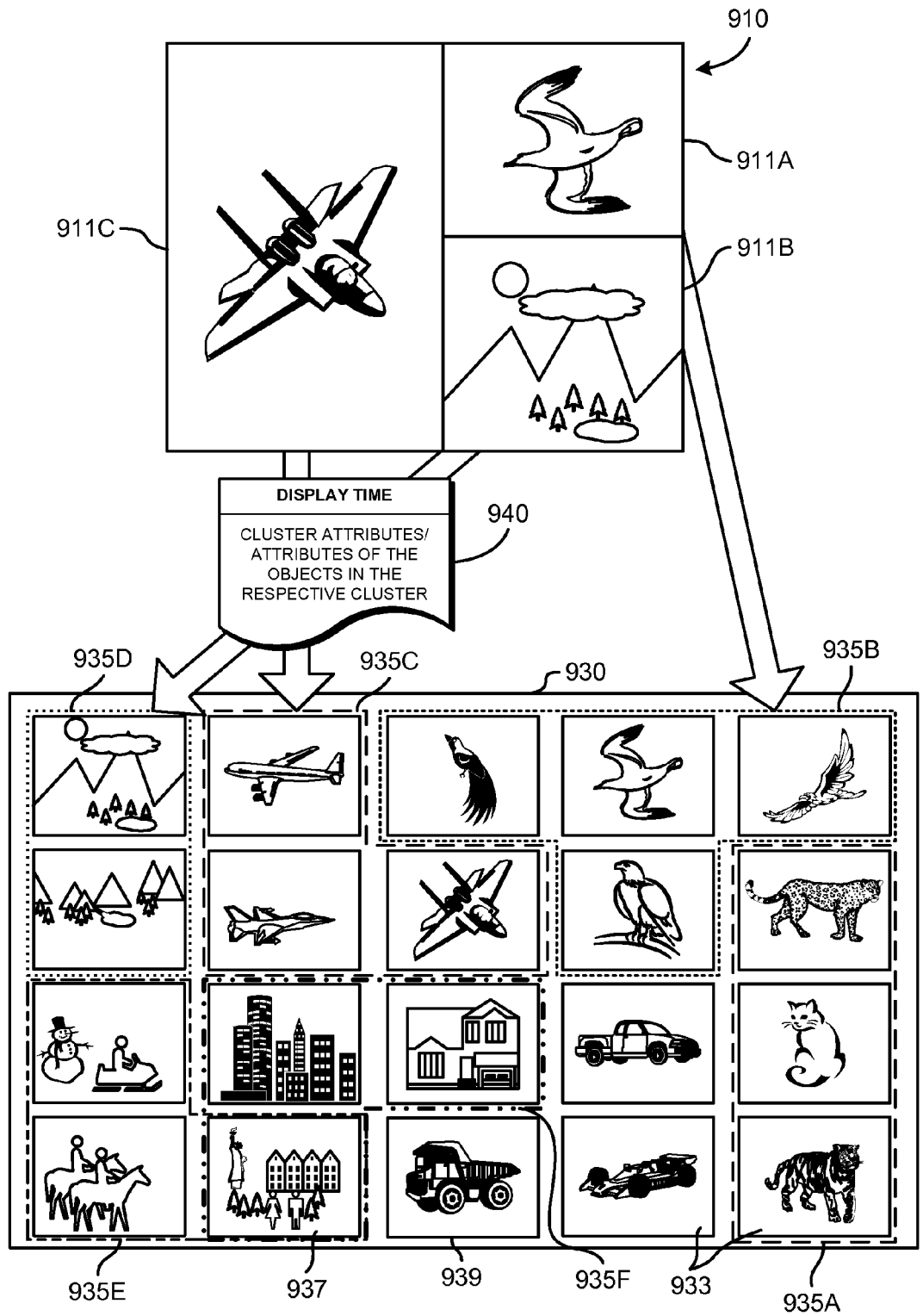
FIG. 9 is a block diagram that illustrates an embodiment of generating display times for respective objects on a display.

FIG. 9 is a block diagram that illustrates an embodiment of generating display times for respective objects 933 on a display 910. The display 910 in the embodiment shown in FIG. 9 includes three portions 911A-C. The respective display times 940 of the objects being displayed in the portions 911A-C are based on one or more of the attributes of the objects in and the attributes of the associated object cluster(s) 935A-F in the object collection 930. Attributes of a cluster may include a number of objects in the cluster, subject(s) of the objects in the cluster, spectral properties of the objects in the cluster (e.g., colors, dynamic range), morphological properties (e.g., similar shapes such as people, cars, tools, houses, birds), location, user rating, tags, age of the objects in the cluster, user access of the object in the cluster, as well as any other cluster attribute.

Objects may be assigned to only one cluster, or objects may be assigned to two or more clusters. For example, object 937 is included in two clusters, cluster 935E and cluster 935F. Cluster 935E may contain objects that include images of humans, and cluster 935F may contain objects that include images of buildings. Since object 937 includes both objects and buildings it may be included in both cluster 935E and 935F. Other objects may not be included in a cluster, for example object 939.

Display portions 911A-C may each be associated with one or more clusters 935A-F. For example, display portion 911A may be associated with cluster 935B, display portion 911B may be associated with cluster 935D, and display portion 911C may be associated with cluster 935C. Also for example, The respective display times 940 of objects displayed in portion 911A may be longer (e.g., always longer, on average longer) than the respective display times 940 of objects in portion 911B due to the attributes of cluster 935B and cluster 935D. For example, cluster 935B may be given a higher user rating than cluster 935D and display time 940 may be based on user rating (increase with user rating, in this example). Thus, the display time 940 of the objects in portion 911A, which are from cluster 935B, will have a longer display time.

By way of another example, the objects in portion 911A may have a shorter display time 940 if display time 940 of an object 933 is inversely proportional to the number of objects in the associated object cluster 935. Thus, since object cluster 935B has four objects and object cluster 935D has two objects, the display time 940 of objects shown in portion 911B may be greater than the display time 940 of objects shown in portion 911A. Since cluster 935C has more objects than cluster 935D and less objects than cluster 935B, the display time 940 of objects displayed in portion 911C may be greater than the display time 940 of objects shown in portion 911A and less than the display time of the objects shown in portion 911B.

Also, a preference may be given to cluster associated with flying objects. Thus, display times 940 of objects associated with cluster 935B and cluster 935C may be greater than the display times 940 of object associated with cluster 935D. However, if a preference is given to landscapes, the objects associated with cluster 935D may have longer display times 940.

Additionally, the display times 940 of objects in the different portions 911A-B may also depend on the size of the portion on the display 910. For example, since portion 911C is larger than portion 911A or portion 911B, the objects displayed in portion 911C may be displayed for less time or more time (always more or less, on average more or less, etc.) than the objects displayed in portion 911A or portion 911B. Or display time may account for both portion size and the cluster attributes. For example, if D=display area of a portion, N=number of objects in an associated cluster, and T=display time, and C is a constant (e.g., baseline parameter) then a display time may be generated according to $$T = C * \frac{D}{N}.$$

Thus, portion 911A would have the shortest display times since the associated cluster 935B has the most objects, and the display area is also ½ the display area of portion 911C. Portion 911B would have a longer display time than 911A, since it has the same display area, but ½ the objects in the associated cluster. Finally, objects displayed in portion 911C would have the longest display times, since it has twice the display area of portion 911B, and 1.5 times the number of objects in the associated cluster as portion 911B. By further example, if, for portion 911A and 911B, D=1, then T for 911A=¼C, for portion 911B T=½C, and for portion 911C T=⅔ C. However, T may also be used as a parameter in a stochastic distribution, and thus display times 940 for objects will vary even among objects that are displayed in the same portion (e.g., objects displayed in portion 911A may have different display times).

Figure 10:
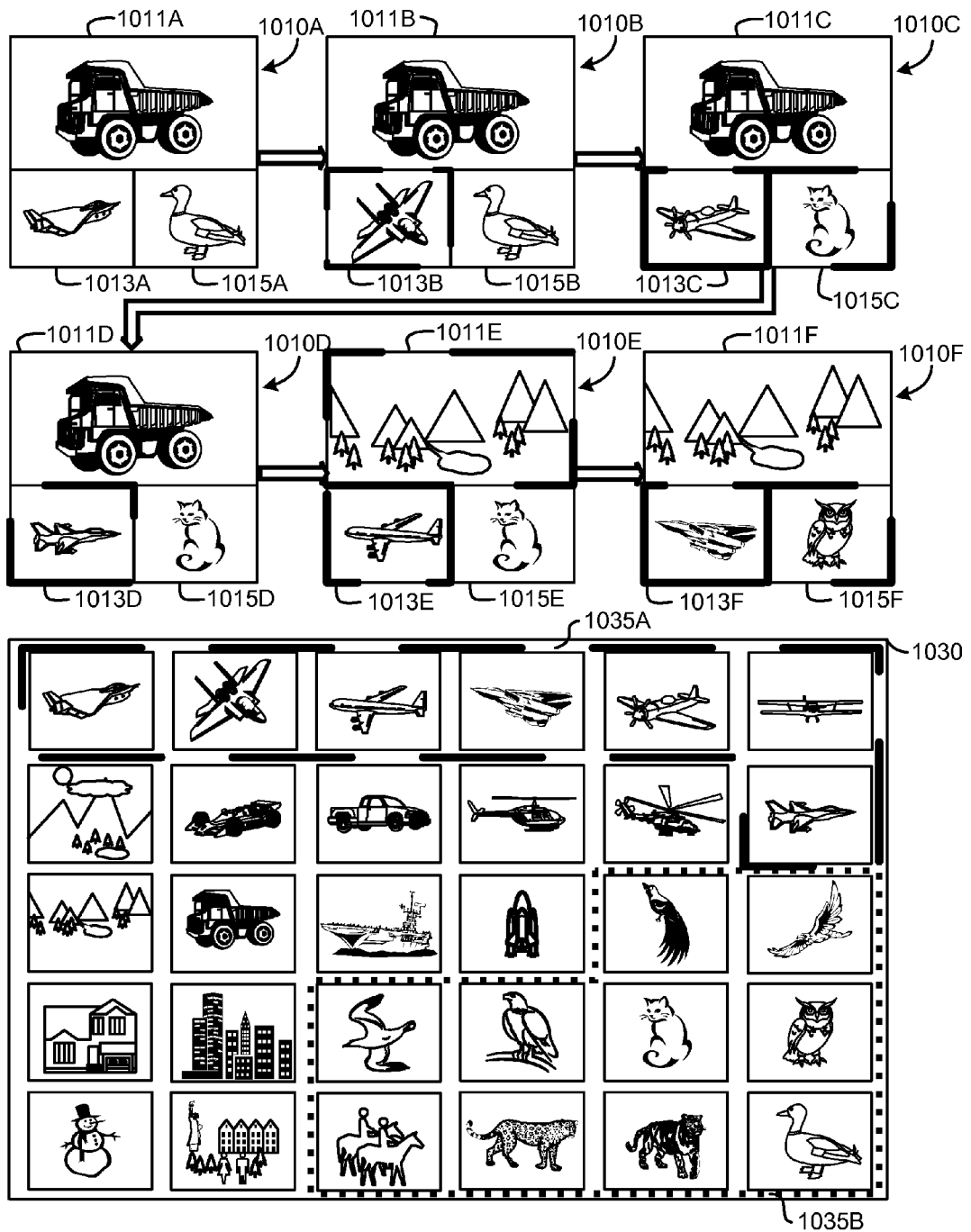
FIG. 10 is a block diagram that illustrates an embodiment of a sequence of views of a display that shows objects for respective display times.

FIG. 10 is a block diagram that illustrates an embodiment of a sequence of display views 1010 that shows objects for respective display times. The display progresses from view 1010A to view 1010F. FIG. 10 also illustrates an object collection 1030 that includes object clusters 1035A-B. The display 1010 includes three display portions, portion 1011, portion 1013, and portion 1015. The objects displayed in portion 1013 are selected from the cluster 1035A. Initially, view 1010A includes the three shown objects in the respective portions, portion 1011, portion 1013, and portion 1015. After a display time for the object in portion 1013 expires, the object changes from the object shown in portion 1013A to the object shown in portion 1013B. However, the objects shown in portions 1011 and 1015 are not changed since their display time has not expired.

Next, moving from view 1010B to view 1010C, the display time for the objects in both portions 1013 and 1015 expire, and the objects change from the object shown in portion 1013B to the object shown in 1013C and from the object shown in 1015B to the object shown in 1015C. Moving from view 1010C to view 1010D, the object shown in portion 1013C changes to the object shown in 1013D, since the display time for the object in portion 1013 expires. Proceeding to view 1010E, the display time for the object in 1011 lapses, and the object changes from the object shown in portion 1011D to the object shown in portion 1011E. Additionally, the object shown in portion 1013D changes to the object shown in portion 1013E. Finally, proceeding to view 1010F, the object shown in portion 1013E changes to the object shown in portion 1013F, and the object shown in portion 1015E changes to the object shown in portion 1015F.

In one embodiment, the display time for each of the respective portions 1011, 1013, 1015 is consistent among different displayed objects. For example, each of the views 1010A-F may show a change in the display after a time interval T has passed since a previous view, and portion 1013 may change objects every T, portion 1015 may change objects every 3*T, and portion 1011 may change objects every 5*T. Also, portion 1013 may have a set interval T, and one or more of the other portions may change based on other functions and attributes. For example, the display times associated with the objects in portion 1011 may be longer because portion 1011 is larger than the other portions.

Also, objects displayed in portion 1011 and portion 1015 may be selected from all the objects in the object collection 1030. Thus, in view 1010A, view 1010B, and view 1010F, portion 1015C includes an object from cluster 1035B, and in view 1010C, view 1010D, and view 1010E, portion 1015C includes an object that is not in cluster 1035A or cluster 1035B.

Figure 11:
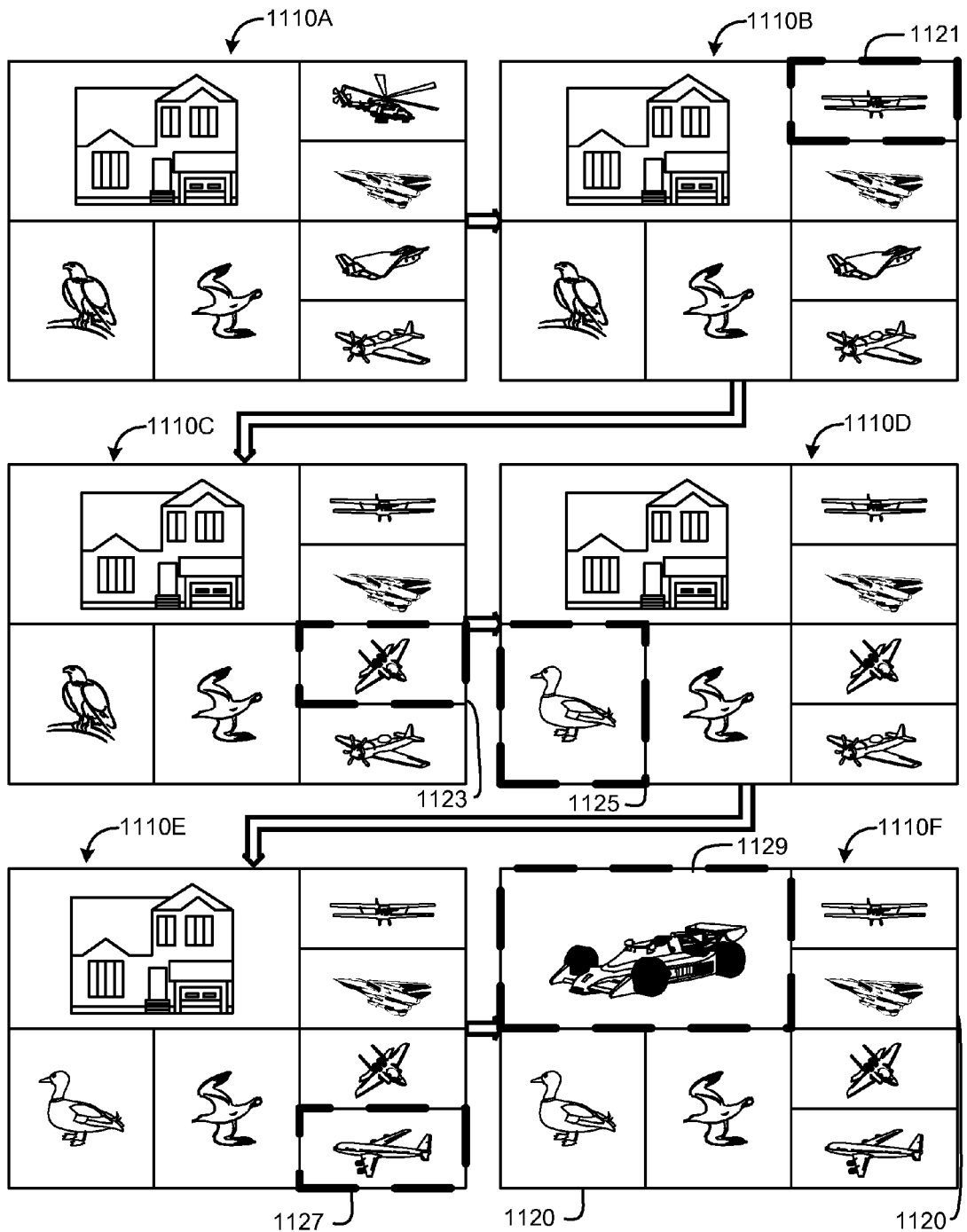
FIG. 11 is a block diagram that illustrates an embodiment of a display that shows objects for respective display times.

FIG. 11 is a block diagram that illustrates an embodiment of a display 1110 that shows objects for respective display times. Display views 1110A-F show the objects that are displayed as time progresses. Starting with the initial view 1110A, after a time interval passes, the display changes to view 1110B, and an object displayed in a first portion 1121 changes. After a second time interval passes, the display changes to view 1110C, and an object displayed in a second portion 1123 changes. Next, after a third time interval passes, the display changes to view 1110D, and an object displayed in a third portion 1125 changes. After a fourth time interval passes, the display changes to view 1110E and an object in a fourth portion 1127 changes. Finally, after a fifth time interval passes, an object in a fifth portion 1129 changes. The objects in two portions 1120 do not change during the time intervals shown. In one embodiment, the display times of all the portions are generated from the same baseline interval, adjustment, attribute values, and stochastic distribution, and the changes in the display 1120 shown in FIG. 11 are the result of the variation in times caused by the use of the stochastic distribution. In other embodiments, the display times may be generated from different attribute values (e.g., size of a display portion).

Figure 12:
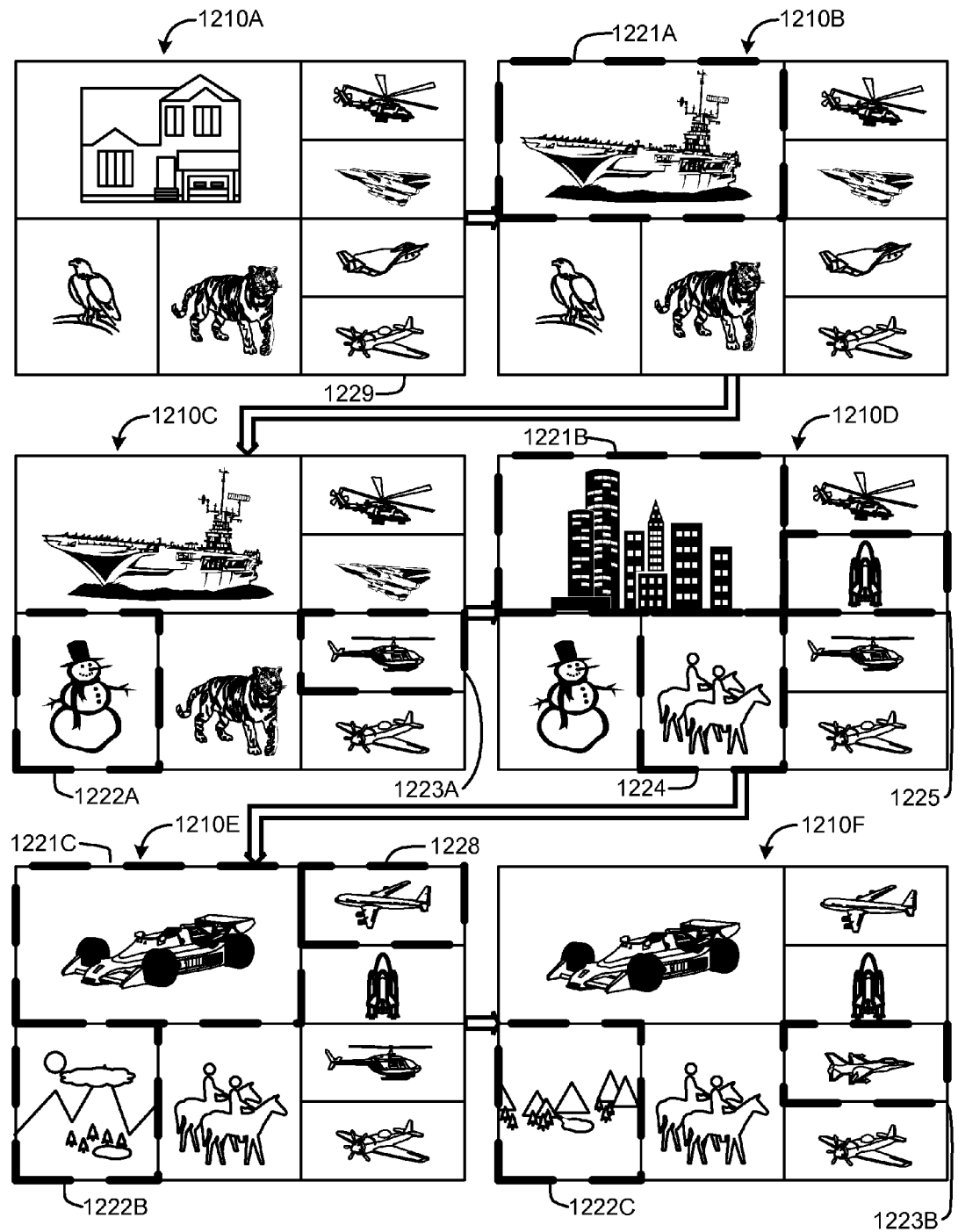
FIG. 12 is a block diagram that illustrates an embodiment of a display that shows objects for respective display times.

FIG. 12 is a block diagram that illustrates an embodiment of a display 1210 that shows objects for respective display times. Display views 1210A-F show the changes in the displayed objects as time passes. View 1210A shows the objects displayed at the beginning, and after time passes the object in portion 1221 changes to the object shown in 1221A and view 1210B is displayed. Next, after time passes, the view changes from view 1210B to the next view 1210C. In view 1210C, the respective objects in portion 1222A and portion 1223A have changed from the objects shown in view 1210B.

After more time passes, view 1201C changes to view 1210D. Three objects in view 1210D have changed from the objects shown in 1210C: the respective objects in portion 1221B, portion 1224, and portion 1225. Next, view 1210D changes to view 1210E, and in view 1210D three more objects have changed: the respective objects in portion 1221C, portion 1222B, and portion 1228. Finally, view 1210E changes to view 1210F, in which the respective objects in portion 1222C and 1223B have changed. Thus, the object shown in portion 1221 has changed three times between views 1210A-F. This could be caused by the objects in portion 1221 having a shorter display time (either absolutely or on average) than the other portions, for example because of the relative size of portion 1221 to the other portions, or the position of portion 1221 on the display.

Also, the object in portion 1222 changed three times between views 1210A-F. This may be because the timing of objects shown in portion 1222 is based on the relative size of portion 1222 compared to the other portions, because of the position of portion 1222 (e.g., on the corner of the display), and/or attributes of one or more clusters of objects associated with portion 1222. The respective objects shown in portion 1223, portion 1225, portion 1228, and portion 1229 may have longer display times (either always or on average) than portion 1221, portion 1222, and portion 1224.

For example, portion 1221 shows a total of 4 objects between views 1210A-F, portion 1222 and portion 1224 combined show a total of 6 objects between view 1210A-F, an average of 3 objects per portion, and portion 1223, portion 1225, portion 1228, and portion 1229 combined show a total of 8 objects, an average of 2 objects per portion. Thus, the average display time of an object shown in portion 1221 is 1.5 time intervals (a time interval is the measure of time one of views 1210A-F is displayed), the average display time of an object shown in one of portions 1222 and 1224 is 2 time intervals, and the average display time of an object shown in one of portions 1223, 1225, 1228, and 1229 is 3 time intervals. However, even though the average display time of an object shown in one of portions 1222 and 1224 is 2 time intervals and the average display time of an object shown in portion 1221 is 1.5 time intervals, the objects shown in portions 1221A and 1221C are shown for at least two time intervals each, and the object shown in portion 1222B is shown for one interval. Thus, even though an average display time of an object shown in portion 1222 or portion 1224 (or other portions, in other embodiments) may be longer than portion 1221 (or other portions, in other embodiments), the display time of a particular object shown in portion 1221 may be longer than the display time of a particular object shown in portion 1222 or portion 1224.

Figure 13:
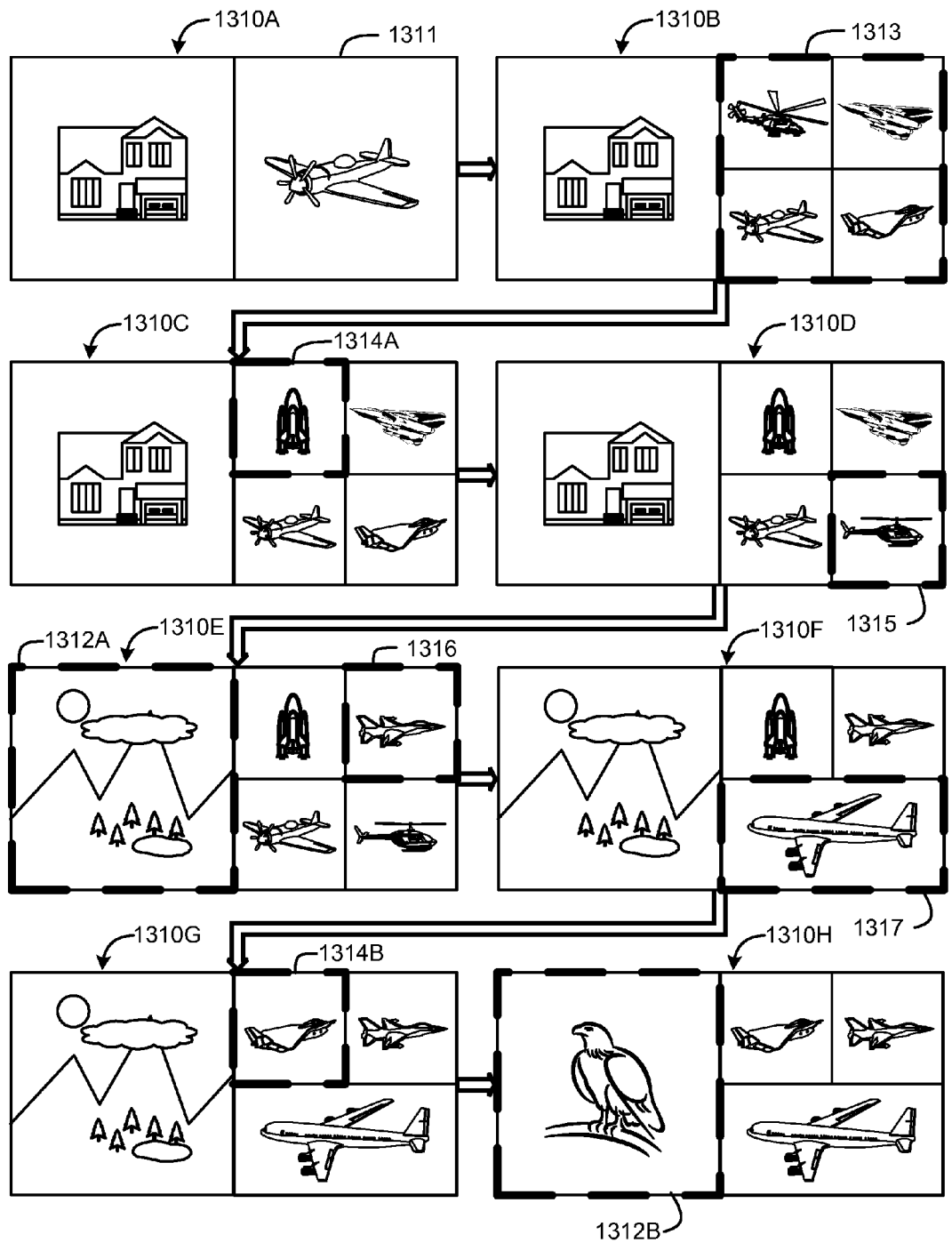
FIG. 13 is a block diagram that illustrates an embodiment of a display that shows objects for respective display times.

FIG. 13 is a block diagram that illustrates an embodiment of a display that shows objects for respective display times. The embodiment of the display shown in FIG. 13 includes portions that change in size and number between different views 1310A-H. Initially, the display includes view 1310A, which includes two portions. After a time interval passes, view 1310A changes to view 1310B. In view 1310B, the objects in portion 1313 have changed from portion 1311 in view 1310A. Though the object shown in 1311 is still shown in portion 1313, 1313 has been divided into 4 portions, which each include a respective object (one of which is the object in portion 1311). After another time interval passes, view 1310B changes to view 1310C. View 1310C includes a new object in portion 1314A. Next, view 1310C changes to view 1310D, and the object shown in portion 1315 changes.

View 1310D then changes to view 1310E, and the respective objects shown in portion 1312A and portion 1316 change. After another time interval, view 1310E changes to 1310F. In 1310F, two portions have combined from the previous view into portion 1317, which also includes an object not displayed in view 1310E. Then view 1310F changes to view 1310G, and the object in 1314B changes. Finally, view 1310H is shown, and the object included in portion 1312B changes.

The display times of the objects shown may vary as portions are divided into smaller portions or combined into a larger portion. For example, the display time (e.g., average display time) of respective objects shown in portion 1311 may be less than the respective display times of the objects shown in each of the four portions of portion 1313. Also, the respective display times of objects shown in portion 1317 may be greater than the respective display times of the objects shown in portion 1311 and less than the respective display times of the object shown in each of the four portions of portion 1313. Or respective display times could be longer for larger portions (e.g., portion 1311 has the longest, portion 1317 is in the middle, and each of the four portions of 1313 are the shortest).

Figure 14:
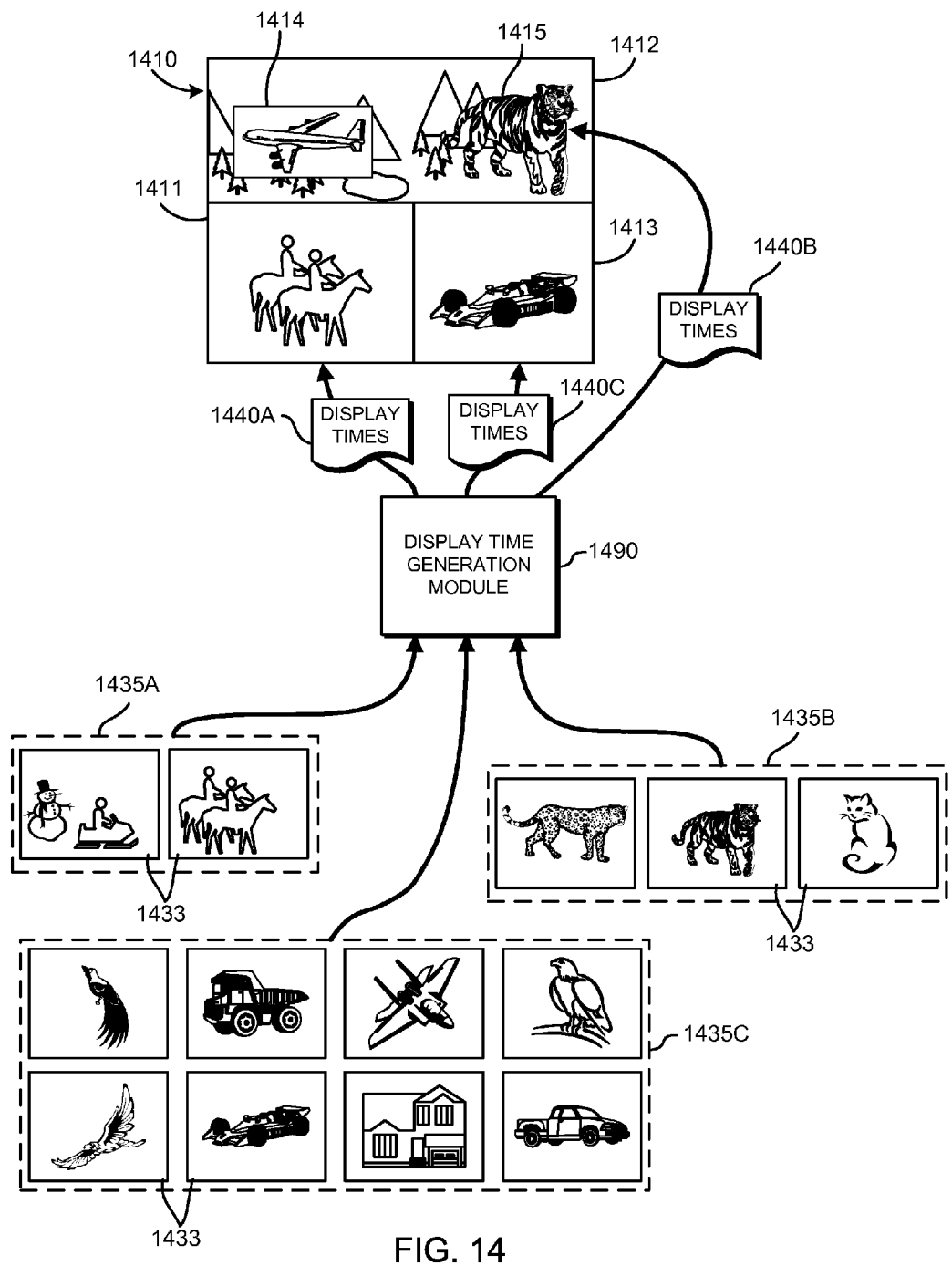
FIG. 14 is a flow diagram that illustrates an embodiment of generating display times for respective objects.

FIG. 14 is a flow diagram that illustrates an embodiment of generating display times for respective objects 1433. A display 1410 includes portion 1411, portion 1412, portion 1413, portion 1414, and portion 1415. Portion 1415 overlaps over portion 1412, and portion 1415 has a shape that varies according to the object displayed in portion 1415. For example, the shape may be the same as or substantially the same as the object displayed in the portion (e.g., the shape may include the object and a small border around the object that has the shape of the outline of the object), or the shape may be a circle, square, pentagon, or other shape. Portion 1415 may also increase in size or decrease in size as different objects are displayed therein, depending on the attributes of the object displayed in portion 1415, as well as on other attributes mentioned herein. Portion 1414 also overlaps portion 1412, and portion 1414 may have a constant size and constant shape in which an object is displayed.

In some embodiments, one of which is illustrated in FIG. 14, portions may partially or completely overlap other portions, and the shape of a portion may vary during the display time of an object. For example, in one embodiment a display may include 4 portions, and each portion may have a small shape at the beginning of the time an object is displayed on the portion. As the object is displayed longer, the portion's size may increase, and, by the end of the display time for the object, the portion that includes the object may be much larger than its initial size. When the portion changes to a new object, the portion may shrink to a smaller size and then increase in size again during the display time of the new object. Also, a portion may decrease in size (i.e., start large and shrink) during the display time of an object. Overlaps between the 4 portions may change as the respective sizes of the portions change. Furthermore, the portions may move around the display during the time an object is displayed.

A display time generation module 1490 generates display times for the objects 1433 shown on the display 1410. In the embodiment shown in FIG. 14, the objects 1433 are divided into cluster 1435A, 1435B, and 1435C. The object 1433 in cluster 1435A are displayed in portion 1411, the objects 1433 in cluster 1435B are displayed in portion 1415, and the objects 1433 in cluster 1435C are displayed in portion 1413. One or more or of these clusters or other clusters and/or collections of objects may be used as a source of the objects displayed in portion 1414 or portion 1412. The display time generation module 1490 generates display times 1440A for the objects 1433 shown in portion 1411 based on the attributes of the objects 1433 in cluster 1435A. The display time generation module 1490 generates display times 1440B for the objects 1433 shown in portion 1412 based on the attributes of the objects 1433 in cluster 1435B, and the display time generation module 1490 generates display times 1440C for the objects 1433 shown in portion 1413 based on the attributes of the objects 1433 in cluster 1435C.

Figure 15:
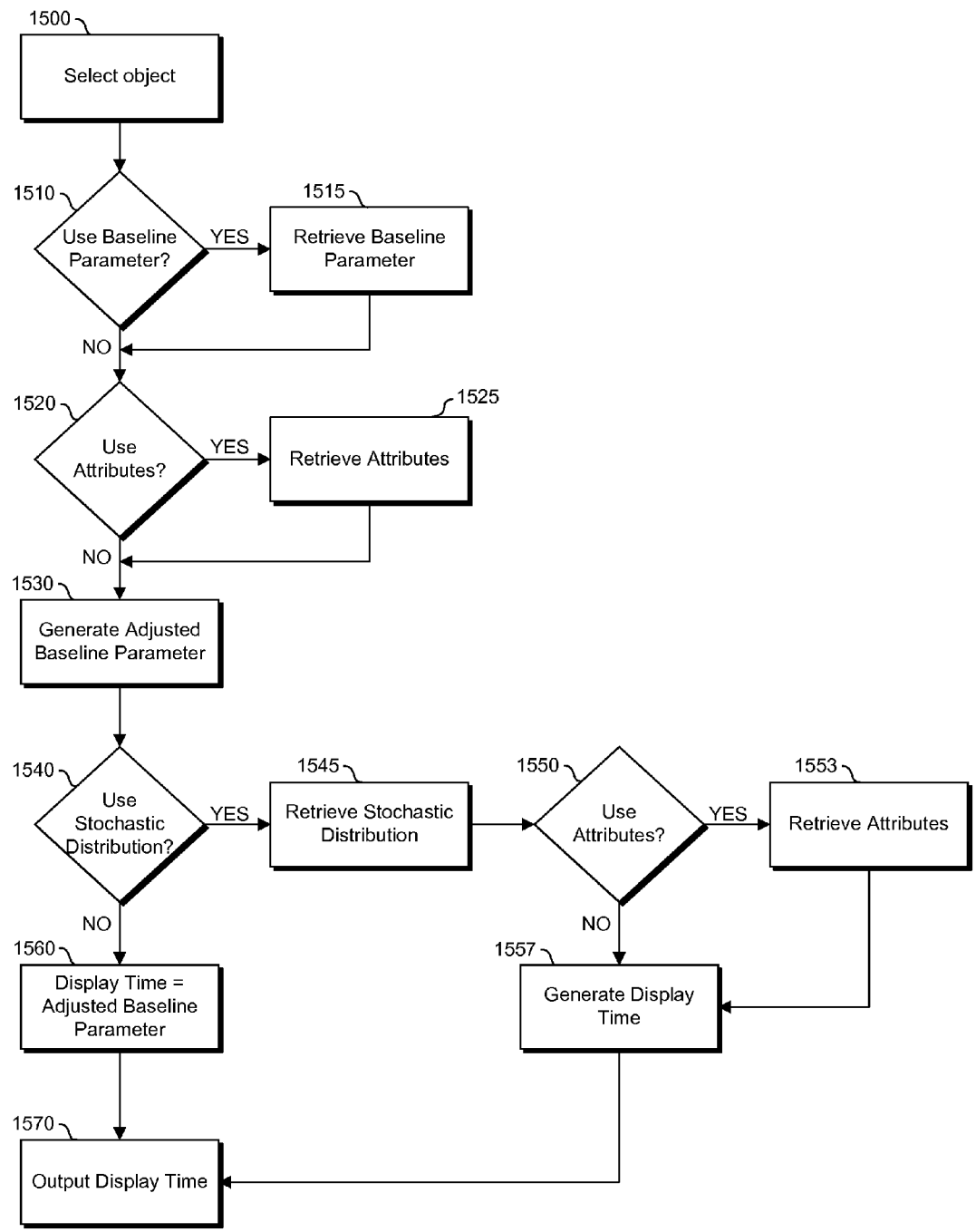
FIG. 15 is a flow diagram that illustrates an embodiment of a method for generating display times for respective objects.

FIG. 15 is a flow diagram that illustrates an embodiment of a method for generating display times for respective objects. Other embodiments of this method and the other methods described herein may omit blocks, add blocks, change the order of the blocks, combine blocks, and/or divide blocks into separate blocks. Additionally, one or more components of the systems and devices described herein may implement the method shown in FIG. 15 and the other methods described herein. Starting in block 1500, an object is selected. Next, in block 1510, it is determined if a baseline parameter will be used to generate a display time for the selected object. If no baseline parameter will be used, then flow proceeds to block 1520. However, if a baseline parameter will be used, then flow proceeds to block 1515, where the baseline parameter is retrieved (e.g., from a computer-readable medium). Flow then proceeds to block 1520.

Figure 16:
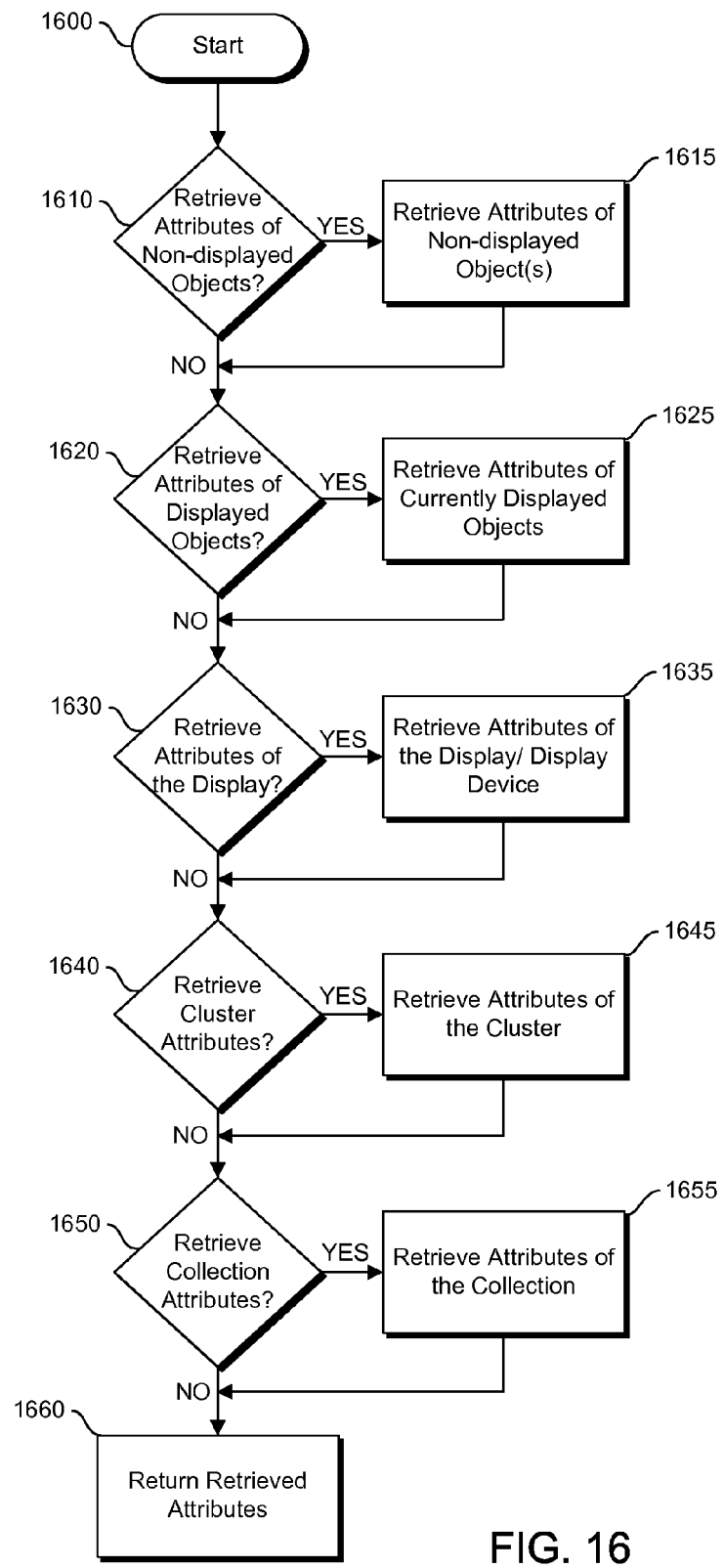
FIG. 16 is a flow diagram that illustrates an embodiment of a method for retrieving attributes.

In block 1520 it is determined if attributes will be used to generate the display time for the selected object. If no attributes will be used, then flow proceeds to block 1530. If attributes will be used, then flow proceeds to block 1525, where attributes are retrieved. FIG. 16 describes one embodiment of retrieving attributes. Flow then proceeds to block 1530. In block 1530, an adjusted baseline parameter is generated, using any retrieved baseline parameter and any retrieved attributes.

Next, in block 1540, it is determined if a stochastic distribution will be used to generate the display time. If not, flow proceeds to block 1560, where the adjusted baseline parameter is set as the display time, and then flow proceeds to block 1570, where the display time is output (e.g., to a display device, to an application that requests a display time for an object).

However, if in block 1540 a stochastic distribution will be used, then flow proceeds to block 1545, where a stochastic distribution is retrieved and/or selected. Flow then proceeds to block 1550, where it is determined if attributes will be used with the stochastic distribution to generate the display time. If no attributes will be used, then flow proceeds to block 1557, where a display time is generated without the attributes. If attributes will be used, flow proceeds to block 1553, where one or more attributes are retrieved, and the flow proceeds to block 1557 where a display time is generated using any retrieved attributes. After block 1557, flow proceeds to block 1570, where the display time is output.

FIG. 16 is a flow diagram that illustrates an embodiment of a method for retrieving attributes. Flow begins in block 1600, for example in response to a request from an application or a device to retrieve attributes. The attributes may be stored on one or more computer-readable media, and the respective computer-readable media may be associated with different computing devices (e.g., servers, desktop computers, laptops, PDAs, smart phones, cellular phones, tablets).

After block 1600, flow proceeds to block 1610, where it is determined if one or more object attributes of any non-displayed objects will be retrieved. The objects whose attributes will be retrieved may include the selected object(s), objects stored in one or more collections, objects stored in one or more clusters (e.g., objects in a cluster associated with a certain object), etc. If the object attributes are to be used, then flow proceeds to block 1615, where the respective attributes of any object(s) are retrieved, for example from any computer-readable media that store the attributes. Retrieving the object attributes or any other attributes may include sending a request to one or more of a computing device or a software application that is associated with the computer-readable medium that stores the desired attributes. After the object attributes are retrieved, then flow proceeds to block 1620. Also, if no attributes of the object not currently being displayed will be used, then flow proceeds from block 1610 directly to block 1620.

In block 1620, it is determined if any attributes of one or more objects currently being displayed will be retrieved. If yes, then flow proceeds to block 1625, where desired attributes of the selected currently displayed objects are retrieved (e.g., from computer-readable media, associated computing devices and/or software applications). Flow then proceeds to block 1630. Also, if no attributes of displayed objects will be used in block 1620, then flow proceeds directly to block 1630.

In block 1630, it is determined if any attributes of the display or display device will be retrieved. If not, then flow proceeds to block 1640. If yes, then flow proceeds to block 1635, where attributes of the display and/or display device are retrieved. These attributes may include, by way of example and not limitation, display size, display device resolution, display device size, display device color space, display device refresh rate, number of display devices, number of portions in the display, changes in the number of portions in the display, changes in the sizes of respective portions of the display, number of objects currently presented on the display, and movement of any objects currently presented on the display. The display and/or display device attributes may be retrieved from a computing device or software application associated with the display and/or display device. After the display/display device attributes are retrieved, the flow proceeds to block 1640.

In block 1640, it is determined if any attributes of one or more clusters are to be retrieved (e.g., the number of objects in the cluster, the device that stores the cluster, date of creation of the cluster). If not, then flow proceeds to block 1650. If yes, then flow proceeds to block 1645, where desired attributes of the one or more clusters are retrieved (e.g., from computing devices, software applications, a computer-readable medium). Flow then proceeds to block 1650.

In block 1650, it is determined if collection attributes (e.g., the number of objects in the collection, the device that stores the collection, date the collection was last modified) are to be retrieved. If not, flow proceeds to block 1660. If yes, then flow proceeds to block 1655, where attributes of the collection are retrieved (e.g., from computing devices, software applications, a computer-readable medium). Flow then proceeds to block 1660, where the retrieved attributes are returned (e.g., to a requesting application, a requesting computing device).

The above described devices, systems, and methods can be achieved by supplying one or more storage media having stored thereon computer-executable instructions for realizing the above described operations to one or more computing devices that are configured to read the computer-executable instructions stored in the one or more storage media and execute them. In this case, the systems and/or devices perform the operations of the above-described embodiments when executing the computer-executable instructions read from the one or more storage media. Also, an operating system on the one or more systems and/or devices may implement the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk and a hard disk), an optical disc (including a CD, a DVD, a Blu-ray disc), a magneto-optical disk, a magnetic tape, and a solid state drive (including flash memory, DRAM, SRAM) can be employed as a storage medium for the computer-executable instructions. The computer-executable instructions may be written to a computer-readable storage medium provided on a function-extension board inserted into the device or on a function-extension unit connected to the device, and a CPU provided on the function-extension board or unit may implement the operations of the above-described embodiments.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method comprising:
    obtaining a collection of objects;
    comparing a value of a first attribute of a first object in the collection of objects to respective values of the first attribute of other objects in the collection of objects;
    determining a display time of the first object based on the comparing of the value of the first attribute of the first object to the respective values of the first attribute of the other objects, wherein the display time of the first object is inversely related to how similar the respective values of the first attribute of the other objects are to the value of the first attribute of the first object;
    generating a display that includes at least part of the first object in a first portion of the display for the display time of the first object, wherein the display is configured for rendering on a display device; and
    removing the first object from the first portion of the display after the display time of the first object has elapsed.

2. The method of claim 1, wherein an object includes one or more of a video, a still image, artwork, and a document.

3. The method of claim 1, wherein the display includes at least part of one or more of the other objects in the collection of objects in other portions of the display while the first object is included in the first portion of the display.

4. The method of claim 1, wherein the display does not include one or more of the other objects in the collection of objects while the first object is included in the first portion of the display.

5. The method of claim 1, wherein the first attribute is a resolution of an object, a default display time of an object, dimensions of a displayed object relative to full dimensions of the displayed object as stored in a memory, a format of an object, a date of creation of an object, a user rating of an object, a location where an object was created, or a morphological property of an object.

6. The method of claim 5, further comprising:
    receiving a user's instruction that identifies the first attribute.

7. The method of claim 1, wherein the display time is further based on one or more of
    a number of other objects displayed while the first object is included in the first portion of the display, and
    dimensions of displayed objects relative to full dimensions of the display.

8. The method of claim 1, further comprising:
    determining a display time of a second object based on a value of the first attribute of the second object and the respective values of the first attribute of the other objects,
    wherein the generated display further includes the second object in a second portion of the display for the display time of the second object.

9. The method according to claim 8, wherein the display time of the second object is different than the display time of the first object.

10. The method of claim 1, further comprising replacing the first object in the first portion of the display with a second object after the display time of the first object has elapsed.

11. The method of claim 1, wherein the display time is further based at least in part on a stochastic distribution.

12. The method of claim 11, wherein respective values of at least one of one or more other attributes of the other objects in the collection of objects are parameters in the stochastic distribution.

13. The method of claim 1, further comprising:
determining the display time of the first object further based on a value of a second attribute of the first object and respective values of the second attribute of the other objects, wherein the display time of the first object is inversely related to a number of the respective values of the second attribute of the other objects that are similar to the value of the second attribute of the first object.

14. A method comprising:
obtaining a collection of images;
determining respective display times for a plurality of images in the collection of images based on respective values of a first attribute of the images in the plurality of images such that when the respective values of the first attribute of other images in the plurality of images are more similar to the respective value of the first attribute of an image in the plurality of images, the display time of the image is shorter; and
generating a display that includes the images in the plurality of images for a duration of their respective display times, wherein the display is configured to be rendered on a display device.

15. The method of claim 14, wherein the display simultaneously includes the images in the plurality of images for at least part of the duration of the respective display times of the images.

16. The method of claim 14, wherein the plurality of images is composed of N images, and wherein an image is displayed on a display area of 1/N relative to a total area of the display.

17. The method of claim 16, wherein the display times depend at least in part on N.

18. The method of claim 17, wherein the display times depend at least in part on a default display time multiplied by N.

19. The method of claim 14, wherein the plurality of images is composed of N images, wherein each image in the plurality of images is asynchronously included in the display, and wherein the respective display times are determined at least in part by a stochastic generator that depends at least in part on N.

20. A method comprising:
determining a display time of a first object based on respective values of a first attribute of a plurality of other objects in a first group of objects such that when the respective values of the first attribute of the other objects in the plurality of other objects are more similar to a value of the first attribute of the first object, the display time of the first object is shorter, wherein the first group of objects includes the first object, and wherein the first group of objects is a subset of a collection of objects;
generating a display that includes the first object at a first portion of the display for the display time of the first object, wherein the display is configured for rendering on a display device; and
removing the first object from the first portion of the display after the display time of the first object has elapsed.

21. The method of claim 20, wherein the display time of the first object is further based on one or more attributes of the first group, wherein the attributes of the first group include the total number of objects in the first group and statistics measuring the distribution and characteristics of objects in the first group.

22. The method of claim 20, further comprising:
determining a display time for a second object based on respective values of a second attribute of a plurality of objects in a second group of objects,
wherein the second group of objects includes the second object,
wherein the second group of objects is a subset of the collection of objects,
wherein the display includes the second object at a second portion of the display for the display time of the second object, and
wherein for at least part of the duration of the display time of the second object the display simultaneously includes the first object and the second object.

23. The method of claim 22, wherein the first group of objects shares at least one object with the second group of objects.

24. The method of claim 22, wherein the first group of objects shares no objects with the second group of objects.

25. The method of claim 20, wherein objects in the first group of objects are images that have similar values for at least one attribute.

26. The method of claim 25, wherein the at least one attribute is not the first attribute.

27. The method of claim 26, wherein the at least one attribute of the first group of objects is a shared subject that is depicted by the images that compose the first group of objects.

28. The method of claim 27, wherein the shared subject is at least one of an animal, a person, a scene, and an inanimate entity.

29. The method of claim 20, wherein
determining the display time of the first object includes comparing the respective values of the first attribute of the plurality of other objects in the first group of objects to the value of the first attribute of the first object.

30. A system comprising:
one or more computer-readable media;
a display interface configured to transmit data to a display device; and
one or more processors configured to cause the system to
compare a value of a first attribute of a first object to a value of the first attribute of a second object,
calculate a first display time for the first object based on the comparison of the value of the first attribute of the first object to the value of the first attribute of the second object such that, when the value of the first attribute of the second object is more similar to the value of the first attribute of the first object, the first display time is shorter,
compare a value of a first attribute of a third object to a value of the first attribute of a fourth object,
calculate a second display time for the third object based on the comparison of the value of the first attribute of the third object to the value of the first attribute of the fourth object such that, when the value of the first attribute of the third object is more similar to the value of the first attribute of the fourth object, the second display time is shorter,
generate a display that includes at least part of the first object for a duration of the first display time, wherein the display is configured to be rendered on a display device, and generate a display that includes at least part of the third object for a duration of the second display time.

31. A display method comprising:

retrieving a first selection of multiple objects from among a collection of objects stored in a data storage device;

displaying the first selection of multiple objects on a display surface of a display device;

comparing respective values of a first attribute of the objects in the first selection of multiple objects to respective values of the first attribute of other objects in the collection of objects;

generating a baseline shuffle interval based on the comparing of the respective values of the first attribute of the objects in the first selection of multiple objects to the respective values of the first attribute of the other objects such that, when the values of the first attribute of the objects in the first selection of objects are more similar to the values of the first attribute of the other objects in the collection of objects, the baseline shuffle interval is shorter;

retrieving a second selection of multiple objects from among the collection of objects stored in the data storage device; and displaying the second selection of multiple objects on the display surface of the display device after the first selection of multiple objects has been displayed for the baseline shuffle interval.

* * * * *